US011827738B2

(12) United States Patent
Chernyshov

(10) Patent No.: US 11,827,738 B2
(45) Date of Patent: Nov. 28, 2023

(54) THIOL-ENE-CURING COMPOSITIONS

(71) Applicant: Momentive Performance Materials GmbH, Leverkusen (DE)

(72) Inventor: Dmitry Chernyshov, Rimpar (DE)

(73) Assignee: Momentive Performance Materials GmbH, Leverkusen (DE)

( * ) Notice: Subject to any disclaimer, the term of this patent is extended or adjusted under 35 U.S.C. 154(b) by 147 days.

(21) Appl. No.: 16/963,073

(22) PCT Filed: Jan. 22, 2019

(86) PCT No.: PCT/EP2019/051437
§ 371 (c)(1),
(2) Date: Jul. 17, 2020

(87) PCT Pub. No.: WO2019/145273
PCT Pub. Date: Aug. 1, 2019

(65) Prior Publication Data
US 2020/0347178 A1 Nov. 5, 2020

(30) Foreign Application Priority Data

Jan. 25, 2018 (EP) ..................... 18153546

(51) Int. Cl.
| | |
|---|---|
| *C08G 18/71* | (2006.01) |
| *C08G 18/16* | (2006.01) |
| *C08G 18/81* | (2006.01) |
| *C08G 18/83* | (2006.01) |
| *C09D 175/04* | (2006.01) |
| *C08G 18/78* | (2006.01) |
| *C08G 18/24* | (2006.01) |
| *C08G 18/20* | (2006.01) |
| *C08G 18/28* | (2006.01) |
| *C08G 18/79* | (2006.01) |
| *C08G 18/67* | (2006.01) |
| *C08G 18/80* | (2006.01) |
| *C08F 290/06* | (2006.01) |

(52) U.S. Cl.
CPC ........... *C08G 18/718* (2013.01); *C08G 18/16* (2013.01); *C08G 18/2063* (2013.01); *C08G 18/246* (2013.01); *C08G 18/289* (2013.01); *C08G 18/672* (2013.01); *C08G 18/7887* (2013.01); *C08G 18/792* (2013.01); *C08G 18/809* (2013.01); *C08G 18/8116* (2013.01); *C08G 18/835* (2013.01); *C09D 175/04* (2013.01); *C08F 290/067* (2013.01)

(58) Field of Classification Search
CPC .. C08G 18/718; C08G 18/16; C08G 18/8116; C08G 18/835; C08G 18/289; C08G 18/2063; C08G 18/246; C08G 18/672; C08G 18/7887; C08G 18/792; C08G 18/809; C09D 175/04; C08F 290/067
See application file for complete search history.

(56) References Cited

U.S. PATENT DOCUMENTS

| | | | |
|---|---|---|---|
| 3,845,056 A | 10/1974 | Robson | |
| 4,697,026 A | 9/1987 | Lee et al. | |
| 5,696,179 A * | 12/1997 | Chawla | ................ C03C 25/106 522/90 |
| 8,987,404 B2 | 3/2015 | Flosbach et al. | |
| 9,534,085 B2 | 1/2017 | Toda et al. | |
| 2011/0014483 A1 | 1/2011 | Okazaki | |
| 2011/0288233 A1 | 11/2011 | Bowman et al. | |
| 2013/0273279 A1* | 10/2013 | Zhou | ................... C09D 163/00 427/386 |
| 2014/0216649 A1* | 8/2014 | Woods | ..................... C08F 8/32 156/275.5 |
| 2014/0272175 A1 | 9/2014 | Curatolo | |
| 2016/0264812 A1 | 9/2016 | Powell et al. | |

FOREIGN PATENT DOCUMENTS

| | | |
|---|---|---|
| CN | 104479098 A | 4/2015 |
| CN | 105153996 B | 9/2017 |
| JP | 2001089568 A | 4/2001 |
| JP | 2016060839 A | 4/2016 |

OTHER PUBLICATIONS

International Search Report and Written Opinion dated Nov. 4, 2019.
A.B. Lowe; "Thiol-ene "click" reactions and recent applications in polymer and materials synthesis: a first update"; Polym. Chem., 2014, (5): 4820-4870.
First Chinese Office Action from Application No. 201980010246.8 dated Dec. 2, 2021.
Translated Japanese Office Action from Japanese Application No. 2020-540,814 dated Feb. 7, 2023.

* cited by examiner

*Primary Examiner* — Rabon A Sergent
(74) *Attorney, Agent, or Firm* — James C. Abruzzo

(57) ABSTRACT

The present invention relates to curable compositions, in particular, thiol-ene-curing compositions, a method of coating using said curable compositions, cured compositions obtained by curing said curable compositions, cured articles, comprising said cured compositions, a certain compound comprising olefinically unsaturated functional groups and a silyl functional group for use in said curable compositions and a method of manufacturing the curable compositions.

17 Claims, No Drawings

THIOL-ENE-CURING COMPOSITIONS

This application claims priority to European Patent Application No. 18153546.9 filed on Jan. 25, 2018.

FIELD OF THE INVENTION

The present invention relates to curable compositions, in particular, thiol-ene-curing compositions, amethod of coating using said curable compositions, cured compositions obtained by curing said curable compositions, cured articles, comprising said cured compositions, a certain compound comprising olefinically unsaturated functional groups and a silyl functional group for use in said curable compositions and amethod of manufacturing the curable compositions.

STATE OF THE ART

Reaction of thiols with electronically deficient olefinically unsaturated acceptors such as acrylates, ethacrylates and vinyls with the formation of thiolether derivatives is well-known in the art (Michael thiol-addition reaction or a thiol-ene "click" reaction). As demonstrated elsewhere (A. B. Lowe in Polym. Chem., 2014, 5, 4820) such reactions are typically catalyzed either by UV-photoinitiators, thermal radical initiators, heteroatom nucleophiles or strong basis. Application of this chemistry for di-, tri- or polyfunctional thiols in combination with di-tri- or polyfunctional olefinically unsaturated resins allows formulation of thermoset compounds. For example, U.S. Pat. No. 9,534,085 or US Patent Application 2011/0288233 demonstrate how thiol-ene curable compositions can be used for the formulation of hybrid composites with improved mechanical properties. Notwithstanding the versatility of the thiolene curing chemistry due to the highly elastic nature of thiolether (dialkylsulfide) bonds, the resulting compositions are still inferior regarding their mechanical properties. This restricts the possibilities of the use of thiol-ene curable compositions for organic coating applications, especially for the formulation of highly durable and hard coating systems typically used for OEM automotive, industrial and refinish applications. This is especially true for thiol-ene curing systems, which do not imply additional photoinitiation or thermal initiation curing mechanisms (photoinitiation and/or thermal initiation allows additional formation of hard C—C crosslinks next to the soft and elastic thiolether polymer matrix). Accordingly, there remains a need for improved thiol-ene curable compositions for those applications where a combination of high durability, hardness, mechanical integrity, scratch- and mar resistance is required. Examples of such applications include in particular automotive OEM coatings, baking industrial varnishes, refinishing and aerospace coating systems.

US Patent Applications 2014/0272175, U.S. Pat. Nos. 4,697,026 and 3,845,056 disclose irradiation-curable dual cure acrylate-based compositions, which are to be cured by radical photopolymerization of the acrylate groups. However, these compositions, which have to be cured radically by irradiation, provide less flexible coating films with a lack of mechanical strength and poor elongation and bending.

Conventional 2K polyurethane coating compositions have the disadvantage that they use polyisocyanate crosslinkers with free NCO groups and also they do not provide cured compositions having enough scratch and mar resistance.

SUMMARY OF THE INVENTION

The current invention provides new curable compositions, in particular the new thiol-ene-curing compositions, in particular, coating compositions, which upon curing demonstrate mechanical, physical and chemical properties superior to the known thiol-ene coatings, and which are essentially free of isocyanates.

In accordance with the present invention, curable compositions are provided, comprising:
(A) one or more compounds having two or more olefinically unsaturated functional groups and at least one silyl group, and
(B) at least one polythiol.

DETAILED DESCRIPTION OF THE INVENTION

The present invention relates to curable compositions, in particular the thiol-ene-curing compositions, as well as coating compositions, which upon curing, demonstrate mechanical, physical and chemical properties superior to the known thiol-ene coatings. In an embodiment, the curable compositions comprise:
(A) one or more compounds having two or more olefinically unsaturated functional groups and at least one silyl group, and
(B) at least one polythiol.

In the following, embodiments of the invention are described.

Component A: Compounds Having Two or More Olefinically Unsaturated Functional Groups and at Least One Silyl Group Components (A) include one or more compounds that have two or more olefinically unsaturated functional groups and at least one silyl group.

In an embodiment of the invention, such compounds (A) are preferably prepared by a process wherein polyisocyanates (D) having three or more isocyanate groups are first reacted with one or more silyl functional compounds (C) having at least one isocyanate-reactive functional group, in a molar ratio that provides for two or more remaining isocyanate groups, and subsequently reacting the resulting reaction product of the polyisocyanate (D) and the silyl functional compound(s) (C) with one or ore compounds (E) having at least one olefinically unsaturated functional group and at least one isocyanate-reactive functional group. It is also possible to carry out the preparation of the compounds (A) in that the polyisocyanate (D) having suitably three or more isocyanate groups are first reacted with one or more compounds (E) having at least one olefinically unsaturated functional group and at least one isocyanate-reactive functional group. In such a process at first the at least two olefinically unsaturated functional groups are introduced through (E). Subsequently the remaining isocyanate group(s) are reacted with one or ore silyl functional compounds (C) having at least one isocyanate-reactive functional group to introduce the silyl group. In this embodiment of the invention, the isocyanate-reactive functional groups selectively react with the remaining isocyanate groups and do not enter into the Michael addition with the acrylate groups already present.

These reactions are suitably carried out in a solvent. Such solvents include for example those which are free of isocyanate-reactive groups. Examples of such solvents are acetone, methyl ethyl ketone, cyclohexanone, methyl isobutyl ketone, methyl isoamyl ketone, diisobutyl ketone, ethyl acetate, n-butyl acetate, ethylene glycol diacetate, butyrolactone, diethyl carbonate, propylene carbonate, ethylene carbonate, N,N-diethylformamide, N,N-dimethylacet amide, N-methylpyrrolidone, N-ethylpyrrolidone, methylal, butylal, 1,3-dioxolane, glycerol, benzene, toluene, n-hexane, cyclohexane, solvent naphtha, 2-methoxypropyl acetate (MPA) or mixtures thereof.

(isocyanatocyclohexyl)-methane etc. Specific examples of such polyisocyanates include e.g.:

the biuret of hexamethylene diisocyanate and oligomers thereof, e.g.:

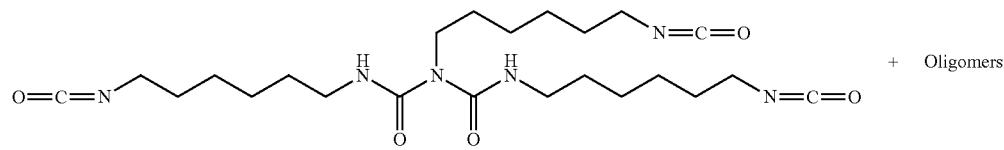 [SMILES: O=C=NCCCCCCNC(=O)N(CCCCCCN=C=O)C(=O)NCCCCCCN=C=O]

In an embodiment of the invention, optionally a catalyst may be used in these reactions. Suitable catalysts may include, but are not limited to, preferably catalysts known to catalyze the isocyanate reaction such as tertiary amines, such as triethyl amine, 1,4-diazabicyclo[2.2.2]octane (DABCO), bismuth, tin and lead compounds such as dibutyl tin dilaurate (DBTDL), dibutyl tin dioctoate etc and combinations thereof.

The reaction may be preferably carried out in a temperature range of about 0° C. to about 100° C., preferably of about 20 to about 80° C., preferably between room temperature (about 25° C.) and about 65° C.

The resulting compounds (A) having two or ore olefinically unsaturated functional groups and at least one silyl group are preferably of the formula (III):

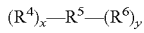 (III)

wherein
$R^4$ is an olefinically unsaturated functional group,
$R^5$ is an (x+y)-valent organic residue,
$R^6$ is a silyl group,
x is an integer of at least 2, preferably 2 to 4, and
y is an integer of at least 1, preferably 1 to 4.

In formula (II) $R^6$ is a silyl group which is capable of forming Si—O—Si crosslinks upon exposure to moisture (condensation curable silyl group). Such silyl groups are well-known in the art and include for example silyl groups of the formula:

—Si($R^{15}$)($R^{16}$)($R^{17}$), wherein $R^5$ is $C_{1-4}$ alkoxy, $C_{2-4}$ alkoxy-$C_{2-4}$ alkoxy, $C_{2-4}$ alkanoyl, enolate, or oxime, preferably $C_{1-4}$ alkoxy, more preferably methoxy or ethoxy, and $R^{16}$ and $R^{17}$ are independently selected from $R^{15}$, in particular, from $C_{1-4}$ alkoxy and/or are $C_{1-6}$ alkyl, such as methyl or ethyl, more preferably $R^{15}$, $R^{16}$, and $R^{17}$ are each selected from $C_{1-6}$ alkoxy, preferably methoxy and ethoxy, or optionally one of $R^{16}$ and $R^{17}$ is $C_{1-6}$ alkyl, such as methyl.

In formula (II) $R^5$ is an (x+y)-valent organic moiety, preferably an aliphatic, including cycloaliphatic, hydrocarbyl moiety having preferably up to 100 carbon atoms, and one or more, preferably two or more heteroatoms such as N, S or O, and which has preferably a molar mass of about 150 to about 10,000, preferably about 200 to about 5000 g/mol, more preferably about 200 to about 1000 g/mol. If $R^5$ is a polymeric organic moiety the number average molecular weight (Mn) determined preferably by GPC (with polystyrene standard) is about 150 to about 10,000. Preferably $R^5$ is an (x+y)-valent organic moiety resulting from three- or higher-valent aliphatic polyisocyanates (D), such as biuret, allophanate, urethane, isocyanurates and higher oligomers of diisocyanates of in particular hexamethylene diisocyanate (HDI), 1-isocyanato-3,3,5-trimethyl-5-isocyanatomethyl-cyclohexane (IPDI or isophorone diisocyanate) and/or bis commercially available e.g. as Desmodur® 100.

the isocyanurate trimer of hexamethylene diisocyanate, e.g.:

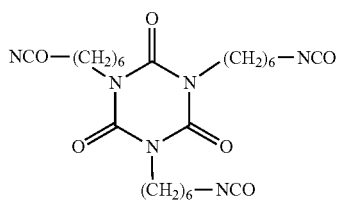

commercially available e.g. as Desmodur® N3300, or higher oligomers thereof such as pentamers:

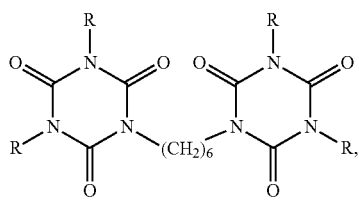

or asymmetric trimers such as:

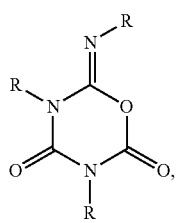

where R is an isocyanate containing aliphatic residue resulting from HDI, or 4,4-methylenebis(cyclohexyl isocyanate) (HMDI or hydrogenated MDI).

The isocyanurate trimer of isophorone diisocyanate, e.g.:

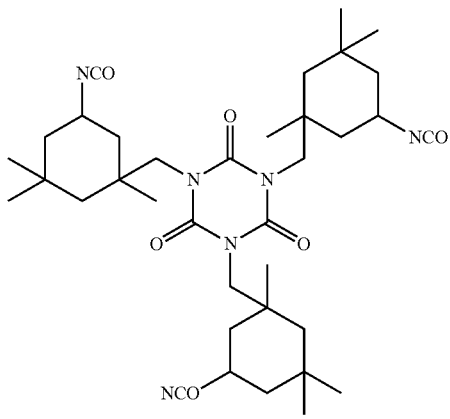

commercially available e.g. as Desmodur® Z4470 or Tolonate IDT 70B.

Further polyisocyanates can be prepared for example from polyhydroxyfunctional compounds or polymers with a preferably at least equimolar amount of diisocyanates such as HDI, IPDI or HMDI to form corresponding polyisocyanates.

$R^4$ is an olefinically unsaturated functional group. Such olefinically unsaturated functional group, should be capable of reacting with polythiols upon curing schematically shown as follows:

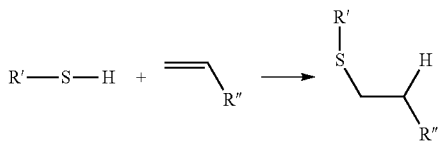

The olefinically unsaturated functional group $R^4$ preferably includes (meth)acrylate or (meth)allyl groups of the formula:

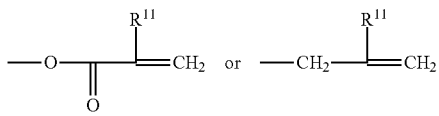

wherein $R^{11}$ and $R^{12}$ are hydrogen or methyl. The olefinically unsaturated functional group is introduced suitably into the components (A) by reacting the reaction product of the polyisocyanate (D) and the silyl functional compound(s) (C) with one or more compounds (E) having at least one olefinically unsaturated functional group and at least one isocyanate-reactive functional group as described below, or (less preferred) by first reacting the polyisocyanate (D) with one or more compounds (E) having at least one olefinically unsaturated functional group and at least one isocyanate-reactive functional group and then reacting the resulting reaction product of compounds (D) and (E) with the silyl functional compound(s) (C) as described herein.

The compounds having two or more olefinically unsaturated functional groups and at least one silyl group (A) preferably have a residual isocyanate content of less than about 0.2 wt-%, preferably less than about 0.1 wt-%, more preferably less than about 0.05 wt-%, still more preferably non-detectable (sometimes designated <0.0 wt-%). The residual isocyanate content may be determined by known procedures such as IR spectroscopy and titration, preferably by titration according to DIN EN ISO 11909.

In a embodiment of the invention, components (A) can be also prepared by reacting conventional polyacrylates with amino silanes in a Michael-type addition reaction to partially react the acrylate groups in such polyacrylates. It has surprisingly been found out however that the components (A) prepared by the above described process, wherein polyisocyanates (D) having three or ore isocyanate groups are first reacted with one or ore silyl functional compounds (C) having at least one isocyanate-reactive functional group, in a molar ratio that provides for two or more remaining isocyanate groups, and subsequent reaction of the resulting reaction product of the polyisocyanate (D) and the silyl functional compound(s) (C) with one or ore compounds (E) having at least one olefinically unsaturated functional group and at least one isocyanate-reactive functional group, or the inverse reaction of reacting first the polyisocyanates (D) with one or ore compounds (E) having at least one olefinically unsaturated functional group and then with the silyl functional compound(s) (C), result in components (A) having improved properties in thiol-ene curing.

Component (C): Silyl Functional Compounds Having at Least One Isocyanate-Reactive Functional Group The silyl functional compounds (C) having at least one isocyanate-reactive functional group are of the formula (V):

$$(R^8)_v\text{—}R^9\text{—}(R^6)_w \qquad (V)$$

wherein
$R^8$ is an isocyanate-reactive functional group, preferably an amino group,
$R^9$ is a (v+w)-valent organic residue,
$R^6$ is a silyl group as defined above, and most preferably a trimethoxysilyl or triethoxysilyl group,
v is an integer of 1 or 2, preferably 1, and
w is an integer of 1 to 3, preferably 1 or 2.

$R^8$ is preferably selected from amino group, a mercapto group, an epoxy group, a hydroxyl group, a carboxy group and an ureido group (—NH—C(=O)—NH$_2$), most preferably an amino group. The amino group in the present invention includes any group of the formula

—NR$^{13}$R$^{14}$, wherein $R^{13}$ and $R^{14}$ are independently selected from the group consisting of hydrogen and an organic residue which may have one or more heteroatoms, and may be substituted for example by a silyl group $R^6$. Preferably one of $R^{13}$ and $R^{14}$ is hydrogen and the other is an organic residue such as an aliphatic, including cycloaliphatic, or an aromatic hydrocarbyl residue with up to 10 carbon atoms and which may comprise one or more heteroatoms such as N, S or O, and which may optionally be substituted for example by another silyl group $R^6$, resulting, in particular, in a secondary amino group for $R^8$. An example where a compound $(R^8)_v$—$R^9$—$(R^6)_w$ (V) has a secondary amino group which carries a further silyl group is e.g.: bis[3-(trimethoxysilyl)propyl] amine:

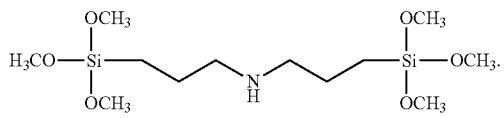 [SMILES: CO[Si](CCCNCCC[Si](OC)(OC)OC)(OC)OC]

Here $R^9$ is a 1,3-propanediyl group, which is substituted by a silyl group $R^6$ and an amino group R, which is —NH—CH$_2$CH$_2$CH$_2$—Si(OCH$_3$)$_3$.

In the present invention an epoxy group includes an epoxy group of the formula:

but shall also include cyclic structures of the formula:

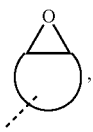

wherein the circle forms a carbocyclic structure such as

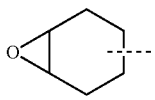

which binds to $R^9$.

$R^9$ is a (v+w)-valent organic residue, preferably an aliphatic residue having up to 10 carbon atoms, more preferably a divalent alkandiyl group with up to 3 carbon atoms and one or more heteroatoms (N or O in particular) such as propane-1,3-diyl, ethane-1,2-diyl, methane-1,1-diyl, 1-(isopropyl)-ethan-1,1-diyl:

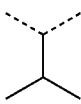

(2-methyl)-propane-1,3-diyl, 3-(methylene-oxy)propan-1-yl:

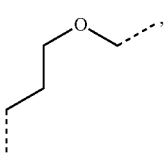

etc.

In an embodiment of the invention, most preferred compounds (C) include secondary amino compounds.

Preferred compounds (C) include, but are not limited to, for example bis[3-(trimethoxysilyl)propyl]amine, bis[3-(triethoxysilyl)propyl]amine, (N-ethyl-3-aminoisobutyl)trimethoxysilane, (N-ethyl-3-aminoisobutyl)triethoxysilane, (3-glycidoxypropyl)trimethoxysilane, (3-glycidoxypropyl)triethoxysilane, (3-glycidoxypropyl)methyldiethoxysilane, (3-mercaptopropyl)trimethoxysilane, (3-mercaptopropyl)triethoxysilane, (N-phenyl-3-aminopropyl)trimethoxysilane, (N-phenyl-3-aminopropyl)triethoxysilane, N-(2-aminoethyl)-3-aminopropyltrimethoxysilane, N-(2-aminoethyl)-3-aminopropyltriethoxysilane, N-cyclohexyl-3-aminopropyltrimethoxysilane, N-cyclohexyl-3-aminopropyltriethoxysilane, N-cyclohexylamino-methyltriethoxysilane, N-cyclohexylamino-methyltrimethoxysilane, 3-aminopropyltriethoxysilane, 3-aminopropyltrimethoxysilane, aminomethytrimethoxysilane, aminomethytriethoxysilane, N-ethyl-3-trimethoxysilyl-methylpropamine, N-ethyl-3-trethoxysily-methylpropamine, 3-ureidopropyltrimethoxysilane, 3-ureidopropyltriethoxysilane, beta-(3,4-epoxycyclohexyl)ethyltrimethoxysilane, and bet-(3,4-epoxycyclohexyl)ethyltriethoxysilane.

Component (D): Polyisocyanates

In accordance with the present invention, the polyisocyanates (D) suitably have the formula (IV):

$$R^7-(NCO)_z \quad (IV)$$

wherein $R^7$ is a z-valent organic residue and z is at least 3, preferably 3 to 10, more preferably 3 to 6 and even more preferably 3 or 4. Preferably $R^7$ is an organic residue or moiety, preferably an aliphatic, including cycloaliphatic, a hydrocarbyl moiety having preferably up to 100 carbon atoms, and one or more, preferably two or more heteroatoms such as N, S or O and which has preferably a molar mass of about 150 to about 10,000, preferably about 200 to about 5000 g/mol, more preferably about 200 to about 1000 g/mol. If $R^7$ is a polymeric organic moiety the number average molecular weight ($M_n$) determined preferably by GPC (with polystyrene standard) is about 150 to 10,000. Preferably $R^7$ is a z-valent organic moiety resulting from the three- or higher-valent aliphatic polyisocyanates (D) as described above.

Component E: One or More Compounds Having at Least One Olefinically Unsaturated Functional Group and at Least One Isocyanate-Reactive Functional Groups In accordance with the present invention, compound (E) is suitably a compound of the formula (V):

$$(R^{10})_c-R^{11}-(R^4)_d \quad (V)$$

wherein
$R^{10}$ is an isocyanate-reactive functional group, preferably a hydroxy group,
$R^{11}$ is an aliphatic (c+d)-valent residue, preferably c+d is 2 or 3, more preferably 2,
$R^4$ is an olefinically unsaturated functional group, as defined above,
c is an integer of 1 or 2, preferably 1, and
d is an integer of 1 or 2, preferably 1.

$R^{10}$ is an isocyanate-reactive functional group, which is preferably selected from hydroxyl, amino, carboxy, etc.

$R^{11}$ is preferably an aliphatic di- or trivalent hydrocarbyl group comprising preferably one or more heteroatoms such as N, O and/or S and having preferably having up to 20, more preferably up to 10 carbon atoms and at least one oxygen atom.

In accordance with the present invention, preferred compounds (E) having at least one olefinically unsaturated functional group and at least one isocyanate-reactive functional group are selected from the groups of methacrylic esters and acrylic esters having at least one isocyanate-reactive functional group such as hydroxyl-functional (meth)acrylic monomers. In the present invention the term "(meth)acrylate" is intended to include methacrylate, i.e. esters of methacrylic acids and acrylates, i.e. esters of acrylic acids. Preferred compounds (E) include in particular, hydroxyl-functional (meth)acrylates, e.g. hydroxylalkyl (meth)acrylates, wherein alkyl preferably has 2 to 6, more preferably 2 to 4 carbon atoms, such as for example 2-hydroxyethyl methacrylate, 2-hydroxyethyl acrylate, 3-hydroxypropyl methacrylate, 3-hydroxypropyl acrylate, 2-hydroxypropyl acrylate, 4-hydroxybutyl acrylate, 3-hydroxybutyl acrylate, 2-hydroxybutyl acrylate, 3-(acryloyloxy)-2-hydroxypropyl methacrylate, amino-functional (meth)acrylates, preferably aminoalkyl meth)acrylates, such as aminoethyl methacrylate, aminopropyl methacrylate, aminoethyl acrylate, aminopropyl acrylate, and N-methyl aminoethyl methacrylate. More preferred are hydroxyl (meth)acrylates such as hydroxyethyl methacrylate, hydroxypropyl methacrylate and hydroxybutylmethacrylate. More preferred are hydroxyl-functional acrylates, still more preferred are hydroxylalkyl acrylates and most preferred is 2-hydroxyethyl acrylate. Besides (meth)acrylates, (meth) allyl compounds can be used either alone or in combination with (meth)acrylates. Examples of (meth)allyl materials are allyl ethers such as the monoallyl ether of 1,4-butane diol and the diallylether of trimethylol propane.

Component (A-1)

A particular preferred compound (A) is a compound (A-1) having two or more olefinically unsaturated functional groups and at least one silyl functional group, wherein the silyl functional group is formed by the reaction of a silyl functional compound (C) having at least one isocyanate-reactive functional group, and an isocyanate group. Said isocyanate-reactive functional group in the silyl functional compound (C) is preferably selected from the group consisting of an amino group, a mercapto group, an epoxy group, a hydroxyl group and an ureido group, more preferably it is an amino group.

As described above, such compounds can be prepared, in particular, by reacting the polyisocyanates (D) as described above at first with one or more silyl functional compounds (C) having at least one isocyanate-reactive functional group, in a molar ratio that suitably provides for two or more remaining isocyanate groups, and subsequently reacting the resulting reaction product of the polyisocyanate (D) and the silyl functional compound(s) (C) with one or more compounds (E) having at least one olefinically unsaturated functional group and at least one isocyanate-reactive functional group, or the other way round, that is, by reacting the polyisocyanates (D) having suitably three or more isocyanate groups at first with one or more compounds (E) having at least one olefinically unsaturated functional group and at least one isocyanate-reactive functional group and subsequently reacting the remaining isocyanate group(s) with one or more silyl functional compounds (C) having at least one isocyanate-reactive functional group to introduce the silyl group. In any case for preparing the compounds (A-1) the silyl functional group is introduced by the reaction of an isocyanate-functional compound with a compound that has an isocyanate-reactive functional group.

Corresponding compounds (A-1) are in particular of the formula (VI):

wherein $R^4$ is an olefinically unsaturated functional group as defined above, $R^{18}$ is an (x+y)-valent organic residue, preferably $R^{18}$ is a (x+y)-valent organic residue, wherein x+y is at least 3, preferably 3 or 4. Preferably $R^{18}$ is an organic residue or moiety, preferably an aliphatic, including cycloaliphatic, hydrocarbyl moiety having preferably up to 100 carbon atoms, and optionally one or more heteroatoms such as N, S or and which has preferably a molar mass of about 150 to 10,000, preferably about 200 to 5000 g/mol, more preferably about 200 to 1000 g/mol. If $R^{18}$ is a polymeric organic moiety the number average molecular weight ($M_n$) determined preferably by GPC (with polystyrene standard) is about 150 to 10,000. Preferably $R^{18}$ is a (x+x)-valent organic moiety resulting from the three- or higher-valent aliphatic polyisocyanates (D) as described above, $R^6$ is a silyl group as defined above, A is selected from divalent residues of the formula:

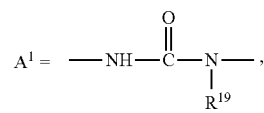

wherein $R^{19}$ has the meaning of $R^{13}$ above, (which residue is formed by the reaction of the isocyanate group with an amino group),

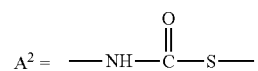

(which residue is formed by the reaction of the isocyanate group with a thiol group),

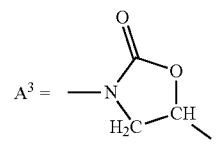

(which residue is formed by the reaction of the isocyanate group with an epoxy group),

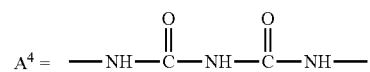

(which residue is formed by the reaction of the isocyanate group with an ureido group),

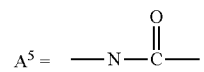

(which residue is formed by reacting isocyanate group with carboxy and subsequent cleavage of carbon dioxide),

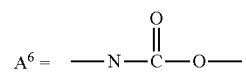

(which residue is formed by the reaction of the isocyanate group with hydroxy functional silanes, which can be formed for example in situ by reacting epoxy compounds with amino compounds, wherein at least one of these compounds have a silyl group), and the most preferably group A is $A^1$, x is as defined above, that is, an integer of at least 2, preferably 2 to 4, y is as defined above, that is, an integer of at least 1, preferably 1 to 4, most preferred y is 1, and w is an integer of 1 to 3, preferably 1 or 2.

Component 8: Polythiols

As described above the polythiols (B) are compounds that can react with groups $R^4$, olefinically unsaturated functional group in a Michael addition-type reaction. Such polythiols are known in the art (see e.g. U.S. Pat. No. 9,534,085 B2, U.S. Pat. No. 8,987,404 B2, each of which is incorporated by reference in its entirety) and can be selected from compounds of the formula (I):

$$R^1\text{—}(SH)_n \quad (I)$$

wherein $R^1$ is an organic residue, preferably with up to 30 carbon atoms more preferably with up to 20 carbon atoms, and at least one, preferably at least two carbon atoms, and optionally comprising one or more heteroatoms such as N, O, S and Si, (in particular also a carbonyl group —(C=O)— or an ester group —(C)(=O)—O—) and n is an integer of at least 2, preferably 2 to 6. The organic residue $R^1$ may also have one or more substituents, including in particular functional groups such as a silyl group $R^6$ as defined above. More preferably the polythiols (B) are compounds of formula (I) comprising at least two groups of the formula (II):

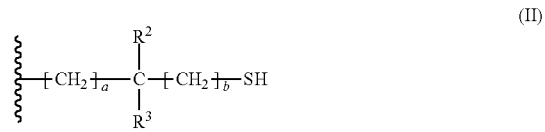

wherein $R^2$ and $R^3$ are independently selected from the group consisting of hydrogen, $C_1$-$C_{10}$ alkyl, and $C_6$-$C_0$ aryl, and a is an integer of 0 to 2, and b is an integer of 0 or 1. For sake of clarity the groups of formula (II) are attached to an organic residue which may have preferably up to 28 carbon atoms more preferably with up to 18 carbon atoms, and at least one, preferably at least two carbon atoms, and optionally comprising one or more heteroatoms such as N, O and S, (in particular also a carbonyl group —(C=O)— or an ester group —(C)(=O)—O—).

Suitable polythiols (B) may include for example alkanethiols, such as methanedithiol, 1,2-ethanedithiol, 1,1-propanedithiol, 1,2-propanedithiol, 1,3-propanedithiol, 2,2-propanedithiol, 1,4-butanedithiol, 2,3-butanedithiol, 1,5-pentanedithiol, 1,6-hexanedithiol, 1,2,3-propanetrithiol, 1,1-cyclohexanedithiol, 1,2-cyclohexanedithiol, 2,2-dimethylpropane-1,3-dithiol, 3,4-dimethoxybutane-1,2-dithiol and 2-methylcyclohexane-2,3-dithiol, polythiols containing thioether groups, such as e.g. 2,4-dimercaptomethyl-1,5-dimercapto-3-thiapentane, 4-mercaptomethyl-1,8-dimercapto-3,6-dithiaoctane, 4,8-dimercaptomethyl-1,11-dimercapto-3,6,9-trithiaundecane, 4,7-dimercaptomethyl-1, 11-dimercapto-3,6,9-trithiaundecane, 5,7-dimercaptomethyl-1,11-dimercapto-3,6,9-trithiaundecane, 4,5-bis(mercaptoethylthio)-1,10dirercapto-3,8-dithiadecane, tetrakis(mercaptomethyl)methane, 1,1,3,3-tetrakis(mercaptomethylthio)propane, 1,1,5,5-tetrakis(rercaptomethylthio)-3-thiapentane, 1,1,6,6-tetrakis(mercaptoethylthio)-3,4-dithiahexane, 2-mercaptoethylthio-1,3-dimercaptopropane, 2,3-bis(mercaptoethylthio)-1-mercaptopropane, 2,2-bis(mercapto)-1,3-dimercaptopropane, bis(mercaptomethyl)sulfide, bis(mercaptorethyl)disulfide, bis(mercaptoethyl)sulfide, bis(mercaptoethyl)disulfide, bis(mercaptopropyl)sulfide, bis(rercaptopropyl)disulfide, bis(mercaptorethylthio)nethane, tris(mercaptomethylthio)methane, bis(rercaptoethylthio) methane, tris(mercaptoethylthio)methane, bis(mercaptopropylthio)methane, 1,2-bis(mercaptomethylthio)ethane, 1,2-bis(mercaptoethylthio)ethane, 2-mercaptoethylthio)ethane, 1,3-bis(mercaptomethylthio)propane, 1,3-bis(mercaptopropylthio)propane, 1,2,3-tris(rercaptomethylthio)propane, 1,2, 3-tris(rercaptoethylthio)propane, 1,2,3-tris(mercaptopropylthio)propane, tetrakis(mercaptomethylthio)methane, tetrakis(mercaptoethylthiomethyl)rethane, tetrakis(mercaptopropylthiomethyl)methane, 2,5-dimercapto-1,4-dithiane, 2,5-bis(mercaptomethyl)-1,4-dithiane and oligomers thereof obtainable according to JP-A-07118263, 1,5-bis(mercaptopropyl)-1,4-dithiane, 1,5-bis(2-mercaptoethylthiomethyl)-1,4-dithiane, 2-mercaptomethyl-6-mercapto-1,4-dithiacycloheptane, 2,4,6-trimercapto-1,3,5-trithiane, 2,4,6-trimercaptoethyl-1,3,5-trithiane and 2-(3-bis(mercaptomethyl)-2-thiapropyl)-1,3-dithiolane, polyester thiols, suitably prepared by the reaction of mercapto-containing carboxylic acids and polyhydric alcohols (such as described in U.S. Pat. No. 9,534,085, which is incorporated by reference in its entirety herein), such as e.g. ethylene glycol bis(2-mercaptoacetate), ethylene glycol bis(3-mercaptopropionate), diethylene glycol (2-mercaptoacetate), diethylene glycol (3-mercaptopropionate), 2,3-dimercapto-1-propanol (3-mercaptopropionate), 3-mercapto-1,2-propanediol bis(2-mercaptoacetate), 3-mercapto-1,2-propanediol bis(3-mercaptopropionate), trimethylolpropane tris(2-mercaptoacetate), trimethylolpropane tris(3-mercaptopropionate), trimethylolethane tris(2-mercaptoacetate), trimethylolethane tris(3-mercaptopropionate), pentaerythritol tetrakis(2-mercaptoacetate), pentaerythritol tetrakis(3-mercaptopropionate), glycerol tris(2-mercaptoacetate), glycerol tris(3-mercaptopropionate), 1,4-cyclohexanediol-bis(2-mercaptoacetate), 1,4-cyclohexanediol bis(3-mercaptopropionate), hydroxymethyl-sulfide bis(2-mercaptoacetate), hydroxymethyl-sulfide bis(3-mercaptopropionate), hydroxyethylsulfide (2-mercaptoacetate), hydroxyethylsulfide (3-mercaptopropionate), hydroxymethyldisulfide (2-mercaptoacetate), hydroxyethyl-disulfide (3-mercaptopropionate), (2-mercaptoethyl ester) thioglycollate, tris[2-(3-mercaptopropionyloxy)ethyl] isocyanurate, ethylene glycol bis(3-mercaptobutyrate), 1,2-propylene glycol (3-mercaptobutyrate), trirethylolpropane tris(3-mercaptobutyrate), ethylene glycol bis(2-mercaptoisobutyrate), 1,2-propylene glycol bis(2-mercaptoisobutyrate), trimethylolpropane tris(2-mercaptoisobutyrate), pentaerythritol tetrakis(3-mercaptobutyrate), 1,3,5-tris(3-mercaptobutyloxyethyl)-1,3, 5-triazine-2,4,6(1H,3H,5H)-trione, 1,4-bis(3-mercaptobutyryloxy)butane, bisphenol A bis(3-mercaptobutyrate), and triphenol methane tris(3-mercaptobutyrate), and bis(2-mercaptoethyl ester) thiodipropionate, as well as aromatic thio compounds, such as e.g. 1,2-dimercaptobenzene, 1,3-dimercaptobenzene, 1,4-dimercaptobenzene, 1,2-bis(mercaptomethyl)benzene, 1,4-bis(mercaptomethyl)benzene, 1,2-bis(mercaptoethyl)benzene, 1,4-bis(mercaptoethyl)benzene, 1,2,3-trimercaptobenzene, 1,2,4-trimercaptobenzene, 1,3,5-trimercaptobenzene, 1,2,3-tris(mercaptomethyl)benzene, 1,2,4-tris(mercaptomethyl)benzene, 1,3,5-tris(mercaptomethyl)benzene, 1,2,3-tris(mercaptoethyl)benzene, 1,3,5-tris(mercaptoethyl)benzene, 1,2,4-tris(mercaptoethyl)benzene, 2,5-toluenedithiol, 3,4-toluenedithiol, 1,4-naphthalenedithiol, 1,5-naphthalenedithiol, 2,6-naphthalenedithiol, 2,7-naphthalenedithiol, 1,2,3,4-tetramercaptobenzene, 1,2,3,5-tetramercaptobenzene, 1,2,4,5-tetramercaptobenzene, 1,2,3, 4-tetrakis(mercaptomethyl)benzene, 1,2,3,5-tetrakis (mercaptomethyl)benzene, 1,2,4,5-tetrakis (mercaptomethyl)benzene, 1,2,3,5-tetrakis(mercaptoethyl) benzene, 1,2,3,4-tetrakis(mercaptoethyl)benzene, 1,2,4,5-tetrakis(mercaptoethyl)benzene, 2,2'-dimercaptobiphenyl and 4,4'-dimercaptobiphenyl.

In an embodiment of the invention, preferred polythiol compounds (B) are polythioethers and polyester thiols, preferably aliphatic polythioethers or aliphatic polyester thiols, in particular aliphatic polyester thiols. Particularly preferred polythiol compounds (B) are pentaerythritol tetrakis(3-mercaptopropionate), trimethylolpropane tris(3-mercaptopropionate), and tris[2-(3-mercaptopropionyloxy) ethyl] isocyanurate.

In an embodiment of the invention, it is also possible that the polythiol (B) comprises at least one silyl group, such as $R^6$ as defined above, and most preferably a trimethoxysilyl or triethoxysilyl group. Such polythiols (B) can be prepared in particular from the three- or higher functional polythiols as described above by reacting them with an thiol-reactive silanes such as an epoxy silane, an (meth)acrylate silane, an isocyanato silane, a halogenalkyl silane etc. preferably an epoxy silane and an (meth)acrylate silane, leading to polythiols (B) having at least two mercapto groups and at least one silyl group as defined above. These silyl functional polythiols (B) allow also to cure one or more compounds having two or more olefinically unsaturated functional groups (A") which do not have a silyl group, and therewith nevertheless allow to rely in addition on the advantageous silyl group curing mechanism. The use of such siyl-modified polythiols is therefore applicable to all kind of (meth) acrylates, which include not only the urethane acrylates but also for example all kinds of (meth)acrylate-functional polymers such as polyester acrylates, polyether acrylates, polyetherester acrylates, epoxy acrylates, etc.

The present invention accordingly also relate to a polythiol (B), comprising at least one silyl group. Such polythiols (B) are preferably compounds of the formula (I'):

wherein $R^1$ is an organic residue as defined above, which has at least silyl group, such as s as defined above. The present invention accordingly also relate to acurable composition, comprising:

one or more compounds (A') having two or more olefinically unsaturated functional groups, preferably one or more compounds (A") having two or more olefinically unsaturated functional groups and which do not have a silyl group, (B) at least one polythiol, as defined above, comprising at least one silyl group, preferably $R^6$.

The polythiol compound (B) is generally applied in such an amount that the molar ratio of the ethylenically unsaturated functional group in said compound (A) (or (A') or (A")) is in the range of about 0.1 to about 10, preferably about 0.5 to about 10 mol relative to 1 mol of a mercapto group in said polythiol compound (B).

In accordance to the preferred embodiment of the present invention, the quantity of the polythiol compounds (B) is about 1-25% by weight (wt.) of the total weight of the curable composition.

Curable Compositions

The curable compositions according to the invention preferably comprises:

about 10 to about 90 parts by weight of component (A), and about 10 to about 90 parts by weight of component (B), which corresponds to a weight ratio of component (A) to component (B) of 10:90 to 90:10, preferably 50:50 to 90:10.

Optionally the curable compositions of the invention may comprise based on 100 parts of the total weight of (A) and (B):

up to about 10, preferably about 0.001 to about 10 parts by weight of one or more curing catalysts, in particular, a polymerization initiator, such a thermal or photo polymerization initiator, up to about 5, preferably about 0.0001 to about 5 parts by weight based on 100 parts of the component (A) and (B) of one or more silanol condensation catalysts (sometimes referred to also as silane condensation catalyst), in some embodiments a silanol condensation catalyst is not required, up to about 80, preferably 0 to about 20 parts by weight or >0 to about 20 parts by weight of one or more solvents, and up to about 80, preferably about 1 to about 50 parts by weight of one or more conventional additives as described below.

Curing Catalysts

The reaction between the polythiol (B) and the compounds (A) having two or more olefinically unsaturated functional groups and at least one silyl group, proceeds via the well-known thiol-ene addition which is known to proceed through two different mechanisms: free-radical additions and catalyzed Michael additions. Free-radical additions can be initiated by light, heat or radical initiators. The Michael additions are catalyzed by either a base or a nucleophile. All these catalysts shall be covered by the term "curing catalysts" used in accordance to the invention. In addition it is possible to add a silane condensation catalyst The curable composition of the present invention may contain one or more radical polymerization initiators. Such radical polymerization initiator generates a radical due to heat, light, a redox reaction, or the like. That is, the curable composition of the present invention preferably further contains a photopolymerization initiator and/or a thermal polymerization initiator.

Examples of such initiators include, but are not limited to, organic peroxides, azo compounds, redox initiators, and the like. Examples of the organic peroxides include benzoyl peroxide, cumene hydroperoxide, di-tert-butyl peroxide, tert-butyl hydroperoxide and dicumyl peroxide.

Specific examples of the azo compound include, but are not limited to, 2,2'-azobispropane, 2,2'-dichloro-2,2'-azo bis-propane, 1,1'-azo(methylethyl) diacetate, 2,2'-azobisisobutane, 2,2'-azobisisobutylamide, 2,2'-azobisisobutyronitrile (AIBN), 2,2'-azo-bis-2-methyl methylpropionate, 2,2'-dichloro-2,2'-azobisbutane, 2,2'-azobis-2-methylbutyronitrile, 2,2'-dimethyl azobisisobutyrate, 3,5-dihydroxymethylphenylazo-2-methylmalonodinitrile, 2,2'azobis-2-methylvaleronitrile, 4,4'-azobis-4-dimethylcyanovaleric acid, and 2,2'-azobis-2,4-dimethylvaleronitrile.

As the redox initiator, examples include, but are not limited to, combinations of hydrogen peroxide-iron (II) salt, organic peroxide-dimethylaniline, cerium (IV) salt-alcohol, and the like. Examples of the photopolymerization initiator include, but are not limited to, photopolymerization initiators such as alkylphenone-based photopolymerization initiators, α-aminoalkyl ketone-based photopolymerization initiators, and phosphine oxide- or phosphinate (hypophosphite)-based photopolymerization initiators.

More specifically, as the alkylphenone-based photopolymerization initiator, examples include, but are not limited to, 1-hydroxycyclohexyl phenyl ketone, 2,2-dimethoxy-1,2-diphenylethan-1-one, 2-hydroxy-2-methyl-1-phenylpropan-1-one, 1-[4-(2-hydroxyethoxy)phenyl]-2-hydroxy-2-methyl- 1-propan-1-one, 2-hydroxy-1-{4-[4-(2-hydroxy-2-methylpropionyl)benzyl]phenyl}-2-methylpropan-1-one, and the like.

Examples of the α-aminoalkyl ketone-based photopolymerization initiators include 2-ethyl-1-[4-(methylthio)phenyl]-2-morpholinopropan-1-one, 2-benzyl 1-2-dimethylamino-1-(4-morpholinophenyl)-1-butanone, 2-dimethylaino-2-(4-ethylbenzyl)-1-(4-morpholin-4-ylphenyl)butan-1-one, and the like.

Examples of the phosphine oxide-based photopolymerization initiators include, but are not limited to, bis(2,4,6-trimethylbenzoyl) phenyl phosphine oxide, bis(2,6-dimethoxybenzoyl)-2,4,4-trimethylpentyl phosphine oxide, 2,4,6-trimethylbenzoyl-diphenyl phosphine oxide, ethyl (2,4,6-trimethylbenzoyl) phenyl phosphinate and the like.

In an embodiment of the invention, most preferred are and phosphine oxide- or phosphinate (hypophosphite)-based photopolymerization initiators, such as ethyl (2,4,6-triethylbenzoyl) phenyl phosphinate.

In addition, two or more types of these photopolymerization initiators may be added as a mixture. As other initiators, dialkyl disulfides such as tetraalkyl thiuram disulfide in which the S—S bonds are easily decomposed by heat can also be used.

Aside from radical initiators, the thiol-ene reaction can be readily and preferably accomplished under base or nucleophilic catalysis. Such catalysts can be selected for example from the group consisting of guanidines, amidines, hydroxides, alkoxides, oxides, amines such as tertiary amines, alkali metal carbonates, alkali metal bicarbonates, alkali metal phosphates, alkali metal hydrogen phosphates, phosphines, phosphites (esters of phosphoric acid esters), silazanes, alkali metal salts of carboxylic acids, alkali silicates, in particular, tetra methyl guanidine, 1,8-diazabicyclo(5.4.0)undec-7-ene, 1,5-diazabicyclo(4.3.0)non-5-ene, 1,4-diazabicyclo(2.2.2)octane, tertiary butyl ammonium hydroxide, sodium hydroxide, potassium hydroxide, sodium ethoxide, sodium ethoxide, tri potassium phosphate, calcium oxide, trimethylamine, triethylaine, hexamethyldisilazane, sodium carbonate, potassium carbonate, sodium bicarbonate, potassium bicarbonate, potassium hydrogen phosphate (monobasic and di-basic), phosphines such as triphenyl phosphine, triethyl phosphine, sodium silicate, potassium acetate, potassium acrylate, and potassium octanoate. Most preferred are DBU (1,8-Diazabicyclo[5.4.0]undec-7-ene), DABCO (1,4-Diazabicyclo[2.2.2]octane), triphenylphosphine sodium methoxide, trimethylamine, hexamethyldisilazane, and triethoxyphosphite.

Most preferably the curable compositions of the invention are cured by thermal curing using an amine catalyst.

The amount of the polymerization initiator used is, with respect to a total of 100 parts by mass of the components (A) and the polythiol component (B), preferably from about 0.001 to about 10 parts by mass, more preferably from about 0.005 to about 5 parts by mass, and still more preferably from about 0.01 to about 3 parts by mass.

Since the curable compositions according to the invention also comprise condensation-curable silyl groups (dual cure compositions) which cure upon exposure to moisture it is also possible that the curable compositions according to the invention comprise a conventional condensation and cross-linking silyl curing catalyst (or silane condensation catalyst). Such silane condensation catalysts may include carboxylates of metals, such as tin, zinc, iron, lead and cobalt; organic bases; inorganic acids; and organic acids, such as dibutyl tin dilaurate (DBTDL), dibutyl tin diacetate, dioctyl tin dilaurate, stannous acetate, stannous caprylate, lead naphthenate, zinc caprylate, cobalt naphthenate, ethyl amines, dibutyl amine, hexylamines, pyridine, inorganic acids, such as sulphuric acid and hydrochloric acid, as well as organic acids, such as sulphonic acids such as toluene sulphonic acid, carboxylic acids such as acetic acid, stearic acid and maleic acid. Especially the tin carboxylates are used as catalysts. Such silane condensation catalyst can be used in an amount of up to about 5 parts preferably about 0.0001 to about 5 parts by weight based on 100 parts of the component (A) and (B).

Solvents

The curable compositions according to the invention preferably have a solids content of, for example, about 10 to about 85 wt. %, preferably about 25 to about 75 wt. %, based on the weight of the curable composition and may contain in particular organic solvents, which are conventionally used in particular for coating compositions. These may originate from the preparation as described above of the component (A) or are added separately. Examples of suitable solvents include for example monohydric or polyhydric alcohols, e.g., propanol, butanol, hexanol, glycerol, glycol ethers or esters, for example, diethylene glycol dialkyl ether, dipropylene glycol dialkyl ether, each with $C_1$- to $C_6$-alkyl, ethoxypropanol, butyl glycol; glycols, for example, ethylene glycol, propylene glycol, and ketones, e.g., methyl ethyl ketone methyl isobutyl ketone, methyl isoamyl ketone, diisobutyl ketone, acetone, cyclohexanone; aromatic or aliphatic hydrocarbons, for example, toluene, xylene, or straight-chain or branched aliphatic $C_6$-$C_{12}$-hydrocarbons such as n-hexane, cyclohexane, solvent naphtha, esters such as ethyl acetate, n-butyl acetate, ethylene glycol diacetate, butyrolactone, diethyl carbonate, propylene carbonate, ethylene carbonate, N,N-dimethylformamide, N,N-dimethylacetamide, N-ethylpyrrolidone, N-ethylpyrrolidone, ethers such as methylal, butylal, 1,3-dioxolane, and 2-ethoxypropyl acetate (MPA) etc. and mixtures thereof.

As mentioned above the curable compositions of the invention may comprise up to about 80, preferably 0 to about 20 parts by weight or >0 to about 20 parts by weight of one or more solvents based on 100 parts of the total weight of (A) and (B). It is possible that the curable compositions of the invention are solvent-free, in particular where reactive thinners are used as described below.

Additives

The curable compositions according to the invention may optionally contain one or more conventional additives apart from components (A), (B), the solvent and the curing catalyst. Such additives may include for example flow or levelling additives, defoamers, light stabilizers such as antioxidants such as hindered amines, hydroquinones and hindered phenols, preservatives, pigments, extenders, thermoplastic resins, deodorizers; adhesion improving agents such as asilane coupling agent and/or a titanium coupling agent; UV absorber such as benzophenones, benzotriazoles, salicylic acid esters, and metal complex salts; stabilizers such as metal soaps, inorganic and organic salts of heavy metals (for example, zinc, tin, lead, cadmium, and the like), organic tin compounds; a pH adjusting agent such as aliphatic carboxylic acids including acetic acid, acrylic acid, palmitic acid, oleic acid, and mercapto carboxylic acids, and aromatic organic acids including phenols, naphthols, benzoic acid, and salicylic acid; plasticizers such as phthalate esters, phosphate esters, fatty acid esters, epoxidized soybean oil, castor oil, and liquid paraffin alkyl polycyclic aromatic hydrocarbons; waxes such as a paraffin wax, microcrystalline wax, polymerized wax, beeswax, whale wax, and low molecular weight polyolefins; non-reactive diluents such as benzyl alcohol, tar, and bitumen; pigments and fillers such as colour and/or special effect-giving pigments of organic or inorganic type used in paints, e.g. inorganic or organic colour pigments such as titanium dioxide, micronized titanium dioxide, iron oxide pigments such as red iron oxide, para red, carbon black, prussian blue, azo pigments, phthalocyanine pigments, quinacridone or pyrrolopyrrole pigments, special effect pigments such as metal pigments, for example, aluminum or copper, interference pigments, such as, for example, aluminum coated with titanium dioxide, coated mica, graphite effect pigments and iron oxide laminae, fillers such as silica, barium sulfate, talcum, aluminum silicate, magnesium silicate fillers, calcium carbonate, kaolin, talc, mica, bentonite, clay, sericite, glass fiber, carbon fiber, aramid fiber, nylon fiber, acrylic fiber, glass powder, glass balloons, silas balloons, coal powder, acrylic resin powder, phenolic resin powder, metal powder, ceramic powder, zeolite, and slate powder, etc.; blowing agents; dehydrating agents, antistatic agents; antibacterial agents, fungicides, viscosity adjusting agents; perfumes, flame retardants; leveling agents; sensitizers; dispersants, polymerization inhibitors in order to improve the storage stability of the curable compositions such as 4-methoxy-1-naphthol, 1,4-dimethoxynaphthalene, 1,4-dihydroxynaphthalene, 4-methoxy-2-methyl-1-naphthol, 4-methoxy-3-methyl-1-naphthol, 1,4-dimethoxy-2-methyl-naphthalene, 1,2-dihydroxynaphthalene, 1,2-dihydroxy-4-methoxynaphthalene, 1,3-dihydroxy-4-methoxynaphthalene, 1,4-dihydroxy-2-methoxynaphthalene, 1,4-dimethoxy-2-naphthol, 1,4-dihydroxy-2-methylnaphthalene, pyrogallol, methyl hydroquinone, tertiary butyl hydroquinone, 4-methoxyphenol, N-nitroso-N-phenyl hydroxylamine aluminum, and the like.

In accordance with the present invention, it is also possible to use as additives acrylate functional reactive thinners, such as diacrylates selected preferably from 1,3-butanediol diacrylate, 1,4-butanediol diacrylate, 1,6-hexanedioldiacrylate, 1,8-octanediol diacrylate, 1,10-decanediol diacrylate, ethylene glycol diacrylate, propylene glycol diacrylate, neopentyl glycol diacrylate, diethylene glycol diacrylate, triethylene glycol diacrylate, tetraethylene glycol diacrylate, polyethylene glycol diacrylate, dipropylene glycol diacrylate, tripropylene glycol diacrylate, tetrapropylene glycol diacrylate, polypropylene glycol diacrylate, glyceryl ethoxylate diacrylate, glyceryl propoxylate diacrylate, tricyclodecane dimethanol diacrylate, hydroxyl pivalic acid neopentyl glycol diacrylate, neopentylglycol ethoxylate diacrylate, neopentylglycol propoxylate diacrylate, monomethoxy trimethylolpropane ethoxylate diacrylate, monomethoxy trimethylolpropane propoxylate diacrylate, bisphenol A ethoxylate diacrylate, and bisphenol A propoxylate diacrylate etc. and mixtures thereof. Such reactive thinners can be preferably used if the curing is initiated by irradiation in the presence of a photocuring catalyst.

Coating Compositions and Method of Coating

The curable compositions of the present invention may be used in particular as coating compositions. They may be used for the production of single-layer coatings or for the production of one or more coating layers within a multilayer coating, such as, in particular, an automotive multilayer coating, either on an automotive body or on an automotive body part, and for any industrial varnishes, refinishing and aerospace coating systems. The curable compositions can be coated on metal parts, pre-coated metal parts or plastic parts. Most preferably the curable compositions of the present invention are used to prepare a top coat layer of a multilayer coating in particular an automotive multilayer coating. This may relate to both original and repair coating applications.

The coating compositions may in particular be used in pigmented for for the production of a primer surfacer layer of a single stage top coat layer or in pigment-free form for the production of an outer clear top coat layer or a transparent sealing layer of a multilayer coating. They may, for example, be used for the production of a clear top coat layer on a previously applied color-imparting and/or special effect imparting pre-dried base coat layer. As it is well-known in the art, clear or transparent coat layers are usually made up of only binders and solvents (besides conventional coating additives), and therefore usually do not contain any fillers or covering pigments. Coloring of the transparent clear coats may be achieved with dyes or transparent pigments.

The coating compositions may be applied by means of conventional application methods, in particular, by spraying onto any desired uncoated or pre-coated substrates, for example, of metal or plastics. Once applied, layers of the coating compositions using the curable composition of the invention may initially be flashed off to remove any solvent.

Curing of curable composition of the invention can proceed at ambient temperature or thermal curing may proceed at temperatures of, for example, about 40° C. to about 220° C., for example, by baking or irradiating with IR radiation (IR=Infra Red) for about 5 to about 30 minutes. Radiating with IR radiation can be carried out with usual IR dryers, for example for about 3 to about 6 minutes at a distance IR dryer/object surface of about 50-80 cm.

Low bake curing normally is carried out at temperatures below about 100° C., such as about 60 to about 100°. High bake curing is normally out at temperatures above about 100° C. such as above about 100 to about 220° C., preferably about 140 to about 220° C.

The curable compositions of the invention may be also cured in particular by irradiation with high-energy radiation, in particular UV radiation. Thermal curing and radiation curing may proceed simultaneously or in any desired order. UV light sources are preferably those in which the radiant energy in the wavelength range of about 100 to about 500 nm. Examples of conventional UV lamps include: fluorescent UV lamps, high-pressure mercury lamps, UV arc lamps, metal halide lamps, xenon lamps, flash lamps, undoped or Fe or gallium doped mercury lamps, black light lamps, UV LED lamps or UV lasers, such as excimer laser. Said radiation sources generate UV light with a maximum in the wavelength range of about about 200-about 500 nm, preferably the range of about 250-about 400 nm, ore preferably about 320-about 385 nm.

The present invention thus also relates to amethod of coating a substrate, which comprises applying the curable composition according to any of the previous embodiments to said substrate and curing the curable composition, Such method includes in particular 1) applying a coating layer prepared from a curable composition as defined above, and 2) thermal curing and/or irradiation curing of the coating layer. Optionally, the applied coating layer may be flashed off to remove organic solvents and water, if present.

In particular, the present invention relates to a method of coating a substrate, which is to provide a top coat layer, which may be a pigmented or a clear coat lacer, of a pre-coated substrate, in particular a top coat layer of a motor vehicle.

The curable compositions of the invention may be used to provide coatings of a total dry coating thickness of about 10 to about 120 µm, preferably to about 20 to about 80 µm, in particular clear coats having a total dry coating thickness of said ranges.

The present invention further relates to cured articles, comprising the cured compositions made from the curable compositions of the invention.

The present invention also relates to a method of manufacturing a curable composition, which comprises the admixture of a compound (A-1) as described above with at least one curing agent such as a polythiol (B).

In accordance with the present invention curable compositions are provided which upon curing demonstrate improved mechanical, physical and chemical properties such as high durability, hardness, mechanical integrity, scratch- and mar resistance superior to the known thiol-ene coatings which do not have additional silyl functional groups as provided in particular in accordance with the present invention.

In the present invention, it will be understood that any numerical range recited herein includes all sub-ranges within that range and any combination of the various endpoints of such ranges or sub-ranges, be it described in the examples or anywhere else in the specification.

It will also be understood herein that any of the components of the invention herein as they are described by any specific genus or species detailed in the examples section of the specification, can be used in one embodiment to define an alternative respective definition of any endpoint of a range elsewhere described in the specification with regard to that component, and can thus, in one non-limiting embodiment, be used to supplant such a range endpoint, elsewhere described.

It will be further understood that any compound, material or substance which is expressly or implicitly disclosed in the specification and/or recited in a claim as belonging to a group of structurally, compositionally and/or functionally related compounds, materials or substances includes individual representatives of the group and all combinations thereof.

While the above description contains many specifics, these specifics should not be construed as limitations on the scope of the invention, but merely as exemplifications of preferred embodiments thereof. Those skilled in the art may envision many other possible variations that are within the scope and spirit of the invention as defined by the claims appended hereto.

PREFERRED EMBODIMENTS OF THE INVENTION

In the following the preferred embodiments of the invention are summarized.
1. A curable composition, comprising:
   (A) one or more compounds having two or more olefinically unsaturated functional groups and at least one silyl group, and
   (B) at least one polythiol.
2. The curable composition according to embodiment 1, comprising one or more curing catalysts.
3. The curable composition according to any of the previous embodiments, comprising one or more solvents.
4. The curable composition according to any of the previous embodiments, comprising one or more additives.
5. The curable composition according to the previous embodiment, wherein the additives are selected from the group consisting of flow or levelling additives, defoamers, light stabilizers, preservatives, pigments, extenders, reactive thinners, and polymerization inhibitors.
6. The curable composition according to any of the previous embodiments, wherein the polythiol (B) is selected from compounds of the formula (I):

(I)

wherein $R^1$ is an organic residue and n is an integer of at least 2, preferably 2 to 6.
7. The curable composition according to any of the previous embodiments, wherein the polythiol (B) is a compound of the formula (I) comprising at least two groups of the formula (II):

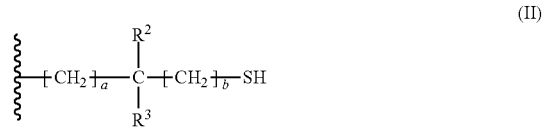
(II)

wherein $R^2$ and $R^3$ are independently selected from the group consisting of hydrogen, C1-C10 alkyl, and C6-C10 aryl, and a is an integer of 0 to 2, and b is an integer of 0 or 1.
8. The curable composition according to any of the previous embodiments, wherein the polythiols (B) are selected from polythioethers and polyester thiols, preferably aliphatic polythioether or aliphatic polyester thiols, in particular, aliphatic polyester thiols, more preferably they are selected from pentaerythritol tetrakis(3-mercaptopropionate), trimethylolpropane tris(3-mercaptopropionate), and tris[2-(3-mercaptopropionyloxy)ethyl] isocyanurate.
9. The curable composition according to any of the previous embodiments, wherein the compounds (A) having two or more olefinically unsaturated functional groups and at least one silyl group are prepared by
   (i) reacting a polyisocyanate (D) having three or more isocyanate groups, with one or more silyl functional compounds (C) having at least one isocyanate-reactive functional group, in a molar ratio that provides for remaining isocyanate groups, and subsequently reacting the reaction product of the polyisocyanate (D) and the silyl functional compound(s) (C) having at least one isocyanate-reactive functional group with one or more compounds (E) having at least one olefinically unsaturated functional group and at least one isocyanate-reactive functional group, or
   (ii) reacting first the polyisocyanates (D) with one or more compounds (E) having at least one olefinically unsaturated functional group and at least one isocyanate-reactive functional group, and then reacting the reaction product of compound (D) and (E) with the silyl functional compound(s) (C).
10. The curable composition according to any of the previous embodiments, wherein the compounds having two or more olefinically unsaturated functional groups and at least one silyl group (A) are of the formula (III):

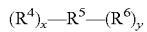
(III)

wherein
   $R^4$ is an olefinically unsaturated functional group,
   $R^5$ is an (x+y)-valent organic residue,
   $R^6$ is a silyl group,
   x is an integer of at least 2, preferably 2 to 4, and
   y is an integer of at least 1, preferably 1 to 4.
11. The curable composition according to any of the previous embodiments, wherein the one or more compounds having two or more olefinically unsaturated functional groups and at least one silyl group (A) have an residual isocyanate content of less than 0.2 wt-% based on the weight of the composition.

12. The curable composition according to any of the previous embodiments, wherein the polyisocyanates (D) are of the formula (IV):

wherein $R^7$ is a z-valent organic residue and z is at least 3.

13. The curable composition according to any of the previous embodiments, wherein the one or more silyl functional compounds (C) having at least one isocyanate-reactive functional group are of the formula (V):

wherein
$R^8$ is an isocyanate-reactive functional group, preferably an amino group,
$R^9$ is a (v+w)-valent organic residue,
$R^6$ is a silyl group as defined above,
v is an integer of 1 or 2, and
w is an integer of 1 or 2.

14. The curable composition according to any of the previous embodiments, wherein the one or more compounds (E) having at least one olefinically unsaturated functional group and at least one isocyanate-reactive functional group are of the formula (VI):

wherein
$R^{10}$ is an isocyanate-reactive functional group, preferably a hydroxy group,
$R^{11}$ is an aliphatic (c+d)-valent residue,
$R^4$ is as defined above,
c is an integer of 1 or 2, preferably 1, and
d is an integer of 1 or 2, preferably 1.

15. The curable composition according to any of the previous embodiments, wherein the one or more compounds (E) having at least one olefinically unsaturated functional group and at least one isocyanate-reactive functional group are selected from hydroxyl-functional (meth)acrylic monomers, preferably hydroxylalkyl (meth)acrylic monomers.

16. The curable composition according to any of the previous embodiments, comprising about 10 to about 90 parts by weight of component (A),
about 10 to about 90 parts by weight of component (B), 17. A method of coating a substrate comprising applying the curable composition according to any of the previous embodiments to said substrate and curing the curable composition.

18. The method of coating a substrate according to the previous embodiment, further comprising providing a top coat layer, preferably a clear top coat layer.

19. A method of coating a substrate according to the previous embodiment, wherein the substrate is a motor vehicle or a component of a motor vehicle.

20. A cured composition obtained by curing the curable composition according to any of the previous embodiments, in particular, a cured coating obtained by curing the curable composition to any of the previous embodiments, preferably by thermal and/or irradiation curing.

21. A cured article, comprising the cured composition according to the previous embodiment.

22. A compound (A-1) having two or more olefinically unsaturated functional groups and at least one silyl functional group, which silyl functional group is formed by the reaction of a silyl functional compound (C) having at least one isocyanate-reactive functional group, preferably an amino group, with an isocyanate group.

23. A compound (A-1) according to any of the previous embodiment, wherein the isocyanate-reactive functional group is selected from the group consisting of an amino group, a mercapto group, an epoxy group, a hydroxyl group and an ureido group, preferably an amino group.

24. A method of manufacturing a curable composition comprising the admixture of the compound (A-1) as described above with at least one curing agent.

25. A polythiol (B), comprising at least one silyl group.

26. A curable composition, comprising:
(A') one or more compounds having two or more olefinically unsaturated functional groups, and
(B) at least one polythiol comprising at least one silyl group.

The process of the present invention will be explained in more detail by the following examples.

EXAMPLES

All parts and percentages are on a weight basis unless otherwise indicated.
Starting Materials:
Silquest A1170—bis[3-(trimethoxysilyl)propyl]amine;
Silquest A-Link15—(N-ethyl-3-aminoisobutyl)trimethoxysilane;
Silquest A-Link600—proprietary, primary aminosilane, trimethoxy;
Silquest A187—(3-glycidoxypropyl)trimethoxysilane;
Silquest A1871—(3-glycidoxypropyl)triethoxysilane;
Silquest A189—(3-mercaptopropyl)trimethoxysilane;
Silquest Y-9669—(N-phenyl-3-aminopropyl)trimethoxysilane;
Silquest A174—[3-(methacryloyloxy)propyl]trimethoxysilane;
Silquest Y-11699—bis[3-(triethoxysilyl)propyl]amine;
Silquest A-597—tris[3-(trimethoxysilyl)propyl]isocyanurate;
Silquest A143—3-chloropropyltrimethoxysilane;
Silquest A-Link35—3-(trimethoxysilyl)propyl isocyanate;
CoatOSil 1220—silicone-polyether copolymer;
CoatOSil 2812—silicone-polyether copolymer;
CoatOSil 7001E—silicone-polyether copolymer;
Borchi Gol 17—silicone-polyether copolymer;
Desmodur N3390—aliphatic polyisocyanate;
Desmodur N3900—aliphatic polyisocyanate;
Tolonate IDT70B—cycloaliphatic polyisocyanate;
Desmophene A365—polyacrylic resin;
Etercure 6150—urethane hexaacrylate resin;
THIOCURE® PETMP—pentaerythritol tetra(3-mercaptopropionate)
THIOCURE® TMPMP—trimethylol propantri(3-mercaptopionate);
THIOCURE® TEMPIC—tris[2-(3-mercaptopropionyloxy)ethyl]isocyanurate;
DBTDL—dibutyltin dilaurate;
DBU—1,8-diazabicyclo[5.4.0]undec-7-ene
Tinuvin® 292—UV light stabilizer UV-HALS UV Absorbers HALS (hindered amine light stabilizers)
Tinuvin® 1130—UV light stabilizer UV-HALS UV Absorbers HALS (hindered amine light stabilizers);
Dowanol® PGDA—propylene glycol diacetate;
PETA—pentaerythritol triacrylate;

HEA—2-hydroxyethyl acrylate
Lucirin TPO-L—photoinitiator
Ti-Pure R960—titanium dioxide;
Blanc Fixe—barium sulphate;
Microtalc AT—talkum;
Heucophos ZPA—zinc phosphate;
HDDA—hexanediol diacrylate;
Nacure 4054—phosphoric acid catalyst.

Example 1 (Comparative—Urethane Acrylate Thiol-Ene (Clearcoat)

The composition of the urethane acrylate coating system used in this example summarized in Table 1.

The preparation of Part A was carried out in two steps: (i) synthesis of the polyisocyanate modified urethane acrylate resin (Table 1, P1-P5); (ii) letdown of the resin with solvents and additives (Table 1, P6-P11).

Capping of the polyisocyanate with the hydroxyethyl acrylate was carried out in a four-neck glass flask equipped with a cooler, mechanical stirrer and a nitrogen counter-flow inlet. At the start of the reaction, the glass flask was thoroughly flushed with nitrogen and charged with the polyisocyanate, solvents and catalyst in the nitrogen counterflow. The hydroxyethyl acrylate was then slowly metered into the polyisocyanate solution under vigorous stirring. The reaction was carried out at room temperature using a water bath for cooling down the reaction. Following the hydroxyethyl acrylate introduction, the reaction mixture was stirred for additional 30 minutes at room temperature. The reaction flask was then heated up to 60° C. and stirring for additional 6 hours. Finally, the reaction mixture was cooled down to room temperature, collected and analyzed for residual —NCO content.

TABLE 1

Composition of urethane acrylate thiol-ene clearcoat (in gr. (= gram))

| | | acrylate (100)% |
|---|---|---|
| Part A | | |
| P.1 | Desmodur N3390 | 23.7 |
| P.2 | Butylglycol acetate | 13.5 |
| P.3 | Ethyl-3-ethoxy propionate | 1.9 |
| P.4 | DBTDL (10% in butyl acetate) | 0.1 |
| P.5 | Hydroxyethyl acrylate (HEA) | 13.2 |
| | NCO-content: | <0.0% |
| P.6 | Butylglycol acetate | 14.3 |
| P.7 | Ethyl-3-ethoxy propionate | 5.9 |
| P.8 | CoatOSil 1220 | 0.05 |
| P.9 | CoatOSil 2812 | 0.1 |
| P.10 | DBU (1wt.-% in Xylene) | 1.8 |
| P.11 | Tinuvin 292 | 0.2 |
| Part B | | |
| P12 | THIOCURE PETMP | 16.5 |
| P13 | Butyl acetate | 4.3 |
| P14 | Xylene | 4.3 |
| | TOTAL COATING | 100 |

Formulation of the Part A system was accomplished by mixing the resulting urethane acrylate resin solution with UV-HALS, flow and levelling additives, catalyst and thinners (Table 1, P.6-P.11). The mixture was stirred for 30 minutes at 300 rpm, collected and stored in a dry and dark place until further use.

Thiol-based crosslinker (Table 1, Part B) used for curing the coating formulation was prepared separately by diluting SH-containing resin with solvents under nitrogen blanketing (Table 1, P12-P14). Resulting crosslinker was collected and stored in a dry and dark place until further use.

Example 2 (Inventive Example—Silane-Modified Urethane Acrylate Thiol-Ene (Clearcoat))

The composition of the silane modified urethane acrylate used in this example is summarized in Table 2.

Preparation of the Part A (clearcoat) was carried out in two steps: (i) synthesis of the silane modified urethane acrylate resin (Table 2, P1-P6); (ii) letdown of the resin with solvents and additives (Table 2, P7-P12).

Preparation of silane-modified urethane acrylate resin was carried out by reacting the polyisocyanate pre-polymer with aminosilane (Table 2, P1-P4) followed by capping the remaining —NCO groups with the hydroxyl-functional alkyl acrylate (Table 2, P5-P6).

The modification of the polyisocyanate with the aminosilane was carried out in a four-neck glass flask equipped with a cooler, mechanical stirrer and a nitrogen counter-flow inlet. At the start of the reaction, the glass flask was thoroughly flushed with nitrogen and charged with polyisocyanate and solvents in the nitrogen counterflow. The silane Silquest A1170 was then slowly metered into the pre-diluted polyisocyanate solution under vigorous stirring. The reaction was carried out at room temperature using a water bath for cooling down the reaction. Following the silane introduction, the reaction mixture was stirred for additional 30 minutes at room temperature. The reaction flask was then heated up to 60° C. and stirring for additional 2 hours. Afterwards, the reaction mixture was cooled down to room temperature, collected and analyzed for residual —NCO content. Capping of the silane-modified polyisocyanate with the hydroxyethyl acrylate was carried out in a four-neck glass flask equipped with a cooler, mechanical stirrer and a nitrogen counter-flow inlet. At the start of the reaction, the glass flask was thoroughly flushed with nitrogen and charged with the solution of silane-modified polyisocyanate and catalyst in the nitrogen counterflow. The hydroxyethyl acrylate was then slowly metered into the polyisocyanate solution under vigorous stirring. The reaction was carried out at room temperature using a water bath for cooling down the reaction. Following the hydroxyethyl acrylate introduction, the reaction mixture was stirred for additional 30 minutes at room temperature. The reaction flask was then heated up to 60° C. and stirring for additional 6 hours. Finally, the reaction mixture was cooled down to room temperature, collected and analyzed for residual —NCO content.

The formulation of the Part A clearcoat systems was accomplished by mixing the silane-modified urethane acrylate with UV-HALS, flow and levelling additives, catalyst and thinners (Table 2, P.5-P.10). The resulting mixture was stirred for 30 minutes at 300 rpm, collected and stored in a dry and dark place until further use.

The thiol-based crosslinkers (Table 2, Part B) used for curing the coating formulation were prepared separately by diluting SH-containing resins with solvents under nitrogen blanketing (Table 2, P13-P17). Resulting crosslinkers were collected and stored in a dry and dark place until further use.

TABLE 2

Composition of Silane modified urethane acrylate based clearcoat systems (in gr.)

|  |  | EX. 2.1 silane/acryl. (20/80)% PETMP | EX. 2.2 silane/acryl. (30/70)% PETMP | EX. 2.3 silane/acryl. (50/50)% PETMP | EX. 2.4 silane/acryl. (50/50)% TMPMP | EX. 2.5 silane/acryl. (50/50)% TEMPIC |
|---|---|---|---|---|---|---|
| | Part A | | | | | |
| P.1 | Desmodur N3390 | 22.9 | 21.5 | 20.5 | 20.5 | 20.5 |
| P.2 | Butylglycol acetate | 15.5 | 15.7 | 17.2 | 17.2 | 17.2 |
| P.3 | Ethyl-3-ethoxy propionate | 2.2 | 2.2 | 2.5 | 2.5 | 2.5 |
| P.4 | Silquest A1170 silane | 7.3 | 10.3 | 16.4 | 16.4 | 16.4 |
| | NCO-content: | <8.3% | <6.4% | <3.8% | <3.8% | <3.8% |
| P.5 | DBTDL (10% in Butyl acetate) | 0.1 | 0.1 | 0.1 | 0.1 | 0.1 |
| P.6 | Hydroxyethyl acrylate | 10.2 | 8.4 | 5.6 | 5.6 | 5.6 |
| | NCO-content: | <0.0% | <0.0% | <0.0% | <0.0% | <0.0% |
| P.7 | Butylglycol acetate | 15.0 | 18.1 | 19.4 | 19.4 | 19.4 |
| P.8 | Ethyl-3-ethoxy propionate | 6.3 | 4.7 | 5.0 | 5.0 | 5.0 |
| P.9 | CoatOSil 1220 | 0.05 | 0.05 | 0.05 | 0.05 | 0.05 |
| P.10 | CoatOSil 2812 | 0.1 | 0.1 | 0.1 | 0.1 | 0.1 |
| P.11 | DBU (1 wt.-% in Xylene) | 1.8 | 1.8 | 1.8 | 1.8 | 1.8 |
| P.12 | Tinuvin 292 | 0.2 | 0.2 | 0.2 | 0.2 | 0.2 |
| | Part B | | | | | |
| P13 | THIOCURE PETMP | 11.2 | 9.2 | 6.0 | | |
| P14 | THIOCURE TMPMP | | | | 6.5 | |
| P15 | THIOCURE TEMPIC | | | | | 8.5 |
| P16 | Butyl acetate | 3.5 | 3.8 | 2.6 | 2.4 | 1.4 |
| P17 | Xylene | 3.5 | 3.8 | 2.6 | 2.4 | 1.4 |
| | TOTAL COATING | 100 | 100 | 100 | 100 | 100 |

Example 3 (Comparative Example—2K Polyurethane Control Coating (Clearcoat))

The composition of the polyurethane control clearcoat system used in this example is summarized in Table 3.

The formulation of the Part A was carried out by mixing hydroxyl-functional polyacrylate resin with solvents and additives (Table 3, P1-P11). The resulting mixture was stirred for 30 minutes at 300 rpm, collected and stored in a dry and dark place until further use.

The polyisocyanate crosslinker (Table 3, Part B) used to cure coating formulation was prepared separately by diluting polyisocyanate resin with solvents under nitrogen blanketing (Table 3, P12-P14). Resulting crosslinker was collected and stored in a dry and dark place until further use.

TABLE 3

Composition of polyurethane control coating (in gr.)

| | Part A | |
|---|---|---|
| P.1 | Desmophene A365 Hydroxyl-functional polyacrylate resin in butyl acetate and xylene. | 48.87 |
| P.2 | Butylglycol acetate | 3.76 |
| P.3 | Butyl acetate | 3.76 |
| P.4 | Dowanol PGDA | 3.76 |
| P.5 | Ethyl-3-ethoxy propionate | 3.76 |
| P.6 | Solvent Naptha | 9.02 |
| P.7 | CoatOSil 7001E | 0.38 |
| P.8 | Borchi Gol 17 | 0.38 |
| P.9 | Tinuvin 292 | 0.38 |
| P.10 | Tinuvin 1130 | 0.75 |
| P.11 | DBTDL (10% in Butyl acetate) | 0.38 |
| | Part B | |
| P.12 | Desmodur N3390 HDI Trimer | 16.54 |
| P.13 | Ethyl-3-ethoxy propionate | 1.5 |
| P.14 | Butylglycol acetate | 6.77 |
| | TOTAL COATING | 100 |

Example 4 (Coating Application)

Substrate Preparation:

Clearcoat compositions were applied on separately pre-painted and dried build-up panels consisted of E-coated CRS (20-25 micron, dft (=dry film thickness)), overcoated with a commercial 2K polyurethane primer-surfacer (30-40 micron dft) and a water-based basecoat (12-15 micron, dft). Spray application of experimental clearcoats was carried out on freshly prepared basecoat panels (e.g. less than 2 h after initial basecoat drying). Application of pigmented topcoat system was carried out on Q-Panel CRS steel panels without pretreatment. Prior paint application surface of steel panels was degreased with xylene and isopropanol. Until explicitly noticed, the pot life of applied two component coatings after mixing of Part A coating and Part B crosslinker was longer than 1 h.

Paint Sprayouts and Cure:

Part A of wet paints from Examples 1-3 were mixed with Part B crosslinkers and spray-applied on the basecoat test panels within maximum 1 h after mixing. All experimental paint systems were sprayed using a Sata Jet conventional gravity feed gun (1.4 mm spray nozzle). Spray pressure was adjusted to 2.0-2.5 bar. Wet film builds of the coating systems were controlled with the lab wet film gauge. After spray application, coating systems were dried and cured. Freshly sprayed wet paints were dried for 15 minutes at room temperature (e.g. to provide initial solvent flash-off), followed by 40 min. baking at 140° C. in the lab. convection oven. Low bake cure was carried out at 60° C. for 45 min or at room temperature overnight. Dry film thickness of the coated films was in the range of 50-60 microns. Before starting the test protocols, all coated panels were additionally conditioned for 7 days at 20° C., 50% RH.

Example 5. (Test Protocol)

Evaluation of mechanical, chemical and physical properties of the experimental coating systems was conducted using the following test methods and procedures: (i) Crockmeter scratch-resistance test in accordance with DIN 55654 (50 double-rubs with 3M281Q WetOrDry polishing paper); (ii) Amtec-Kistler-Test in accordance with DIN EN ISO 20566 (10 cycles); (iii) QUV-B accelerated weatherability test in accordance with ASTMG 53-88; (iv) Cross-hatch adhesion in accordance with EN ISO 2409; (v) Cylindrical mandrel bending test in accordance with EN ISO 6860; (vi) König pendulum hardness was measured in accordance with DIN 53157; (vii) Chemical resistance test was carried out using 0.5M aqueous solution of sulfuric acid. In the test, an experimental coating film was exposed to 30, 60 and 90 min. etching by the sulfuric acid solution (one droplet) at 50° C. After exposure the droplet was removed, the test surface rinsed with plenty of demineralized water, dried and inspected for defects. The test rating score was classified as follows: R10—no visible etching marks; R9—small marks, no relief to feel with fingertip; R8—marks, relief to feel; R6—marks, matt white shiny spots (hazy); R4—starting deterioration, white spots, clear damage to the coating; R2—blister raise; R0—coating delamination. The total rating mark was calculated as an aggregate ΣR of 30, 60 and 90 in. test spots. The higher was the rating the better was the chemical resistance of the tested coating film. Titration of NCO-content was carried out in accordance with DIN EN ISO 11909 norm. Cross-hatch adhesion was measured in accordance with DIN EN ISO 2409.

Example 6. (Test Results from Examples 1-3)

TABLE 4

Mechanical, physical and chemical properties of the experimental silane modified thiol-ene clearcoat systems and control coatings (e.g. 2K polyurethane clearcoat (example 3), silane-free thiol-ene clearcoat system (example 1)).

| | C. EX. 1 acryl. (100)% PETMP | EX. 2.1 silane/acryl. (20/80)% PETMP | EX. 2.2 silane/acryl. (30/70)% PETMP | EX. 2.3 silane/acryl. (50/50)% PETMP | EX. 2.4 silane/acryl. (50/50)% TMPMP | EX. 2.5 silane/acryl. (50/50)% TEMPIC | C. EX. 3 2K PU control |
|---|---|---|---|---|---|---|---|
| MECHANICAL PROPERTIES: | | | | | | | |
| Cross-hatch adhesion | Gt3 | Gt2 | Gt0 | Gt0 | Gt0 | Gt0 | Gt0 |
| Mandrel bending test | OK | OK | OK | OK | OK | OK | OK |
| Impact direct (2 KG, 0.5 m) | OK | OK | OK | OK | OK | OK | OK |
| Impact reverse (2 KG, 0.5 m) | OK | OK | OK | OK | OK | OK | OK |
| SCRATCH and MAR RESISTANCE: | | | | | | | |
| AMTEC start gloss(20')/end gloss/delta | 90.3/87.0/3.3 | 90.1/87.6/2.5 | 89.0/85.6/3.4 | 82.9/75.7/7.2 | 83.9/75.6/8.3 | 82.4/75/7.4 | 88.7/50.4/38.3 |
| Crockmeter start gloss(20')/end gloss/delta | 90.3/87.5/2.8 | 90.1/87.9/2.2 | 89.0/87.4/2.4 | 82.9/78.7/4.2 | 83.9/79.2/4.7 | 82.4/77.9/4.5 | 88.7/49.0/39.7 |
| HARDNESS: | | | | | | | |
| König pendulum hardness (osc.) HB-cure, after 1 h | 38 | 68 | 84 | 129 | 126 | 128 | 140 |
| König pendulum hardness (osc.) LB-cure, after 14 days | 15 | 25 | 33 | 45 | 46 | 44 | 113 |
| QUV-B: | | | | | | | |
| 1500 h delta E-color | broke | 61.3 | 35.8 | 13.9 | 23.8 | 21.4 | 12.5 |
| 1500 h start gloss(20')/end gloss/delta | 90.3/broke | 90.1/50.6/39.5 | 89.0/64.7/24.3 | 82.9/66.5/16.4 | 83.9/66.0/17.9 | 82.4/63.1/19.3 | 88.7/49.2/39.5 |
| CHEMICAL RESISTANCE: | | | | | | | |
| ΣR | 6 | 17 | 19 | 23 | 21 | 23 | 20 |

(If not explicitly mentioned test results are recorded for high bake coating systems).
(Rating in cross-hatch adhesion test: Gt0 (best) to Gt5 (worst), the hardness should be as high as possible and delta gloss should be as small as possible to be considered as good).

Results provided in table 4 demonstrates that acrylic modified polyisocyanate-based clearcoats and silane/acrylic modified polyisocyanate-based clearcoats both demonstrate improved scratch and mar resistance compared to standard 2K polyurethane clearcoat system. Furthermore, only silane/acrylic modified clearcoat allows combination of scratch and mar resistance with improved accelerated QUV-B durability (high rest(end) gloss, low color shift (delta E)), chemical resistance and coating hardness.

Example 7 (Clearcoat Systems where a Commercially Available Urethane Acrylate is Used)

Composition of urethane acrylate thiol-ene clearcoat systems formulated using commercially available urethane acrylate are summarized in Table 5.

TABLE 5

Composition of coating systems based on commercial urethane acrylate (in qr.)

| | | EX. 7.1 Comp. acryl. 100% | EX. 7.2 Inv. silane/ acryl. (50/50)% | EX. 7.3 Inv. silane/ acryl. (50/50)% |
|---|---|---|---|---|
| | Part A (coating) | | | |
| P.1 | Etercure 6150 | 35 | 27.79 | 27.79 |
| P.2 | Silquest A1170 silane | — | 37.32 | — |
| | TOTAL olefin content (%) | 100 | 50-60 | 100 |
| P.3 | Butylglycol acetate | 2.65 | 2.18 | 2.18 |
| P.4 | Ethyl-3-ethoxy propionate | 2.65 | 2.18 | 2.18 |
| P.5 | Butyl acetate | 2.65 | 2.18 | 2.18 |
| P.6 | Xylene | 3.1 | 2.16 | 2.16 |
| P.7 | CoatOSil 7001E | 0.15 | 0.15 | 0.15 |
| P.8 | Tinuvin 292 | 0.2 | 0.21 | 0.21 |
| P.9 | DBU (1% in Xylene) | 3.6 | | |
| | Part B (crosslinker) | | | |
| P.10 | THIOCURE PETMP | 35 | 13.9 | 13.9 |
| P.11 | Xylene | 7.5 | 5.96 | 5.96 |
| P.12 | Butyl acetate | 7.5 | 5.96 | 5.96 |
| P.13 | Silquest A1170 silane | — | — | 37.32 |
| | TOTAL | 100 | 100 | 100 |

Preparation of Part A of the experimental coating 7.1 and 7.3 was carried out by mixing components P1-P9 (Table 5) under vigorous stirring. The resulting transparent mixture was agitated for additions 30 minutes, afterwards collected and stored in dry and dark place until further use.

Preparation of the Part A of the experimental clearcoat 7.2 was carried out in two steps: (i) capping urethane acrylate with aminosilane (Table 5, P1-P2); (ii) Letdown of the resulting silane-modified urethane acrylate resin with solvents and additives (Table 5, P3-P9).

Capping of the urethane acrylate with the aminosilane was carried out in a four-neck glass flask equipped with a cooler, mechanical stirrer and a nitrogen counter-flow inlet. At the start of the reaction, the glass flask was thoroughly flushed with nitrogen and charged with urethane acrylate (Table 5, P1). Afterwards, the silane was slowly metered into the reaction solution under vigorous stirring. Following the silane introduction, the reaction mixture was stirred for additional 30 minutes at room temperature. The reaction mixture was then heated up to 80° C. and stirred for additional 6 hours. Afterwards, the reaction mixture was cooled down to room temperature, collected and analyzed for residual olefinic content. Conversion of aza-Michael addition reaction of aminosilane to the urethane acrylate was investigated spectroscopically using IR analysis. For the calculation, a characteristic deformational vibration band of olefinically unsaturated C=C double bond at 810 cm$^{-1}$ wavenumber was utilized. The peak intensity was calibrated by the internal standard—the characteristic stretching C=O band at 1729 cm$^{-1}$ wavenumber. In addition, conversion of the reaction was investigated with $^1$H-NMR analysis. For this, ratio of integrals of olefinic double bond proton at δ 6.2 ppm to aliphatic Si—C proton at δ 0.5 ppm was utilized. Total olefin content (Table 5) was calculated as a wt.-% of unreacted acrylic groups.

The formulation of the Part A of clearcoat systems was accomplished by mixing silane modified urethane acrylate with UV-HALS, flow and levelling additives, catalyst (Table 5, EX 7.2, P.7-P.9). The resulting mixture was stirred for 30 minutes at 300 rpm, collected and stored in a dry and dark place until further use.

The thiol-based crosslinkers (Table 5, Part B) used for curing the coating formulation were prepared separately by diluting SH-containing resins with solvents under nitrogen blanketing (Table 5, P10-P13). Introduction of aminosilane (EX 7.3) into the thiol-crosslinker was carried under vigorous stirring in nitrogen counterflow. The resulting crosslinkers were collected and stored in a dry and dark place until further use.

While the embodiments according to examples 7.2 and 7.3 are basically according to the invention, these embodiments are less preferred.

Example 8 (Silyl Modified Thiol-Ene Clearcoat Prepared from the Urethane Acrylate from Example 1 Via Michael Addition)

The composition of the urethane acrylate coating system used in the study is summarized in Table 5.1. A clearcoat was prepared in accordance with the general experimental procedure described in Example 7.2, except that instead of commercial urethane acrylate, the urethane acrylate from Example 1 (Table 1, P1-P5) was used and reacted with an amino silane (P.6) via Michael addition.

TABLE 5.1

Composition of olefinized silvl-modified thiol-ene clearcoat - Inventive (in qr.)

| | | EX.8 silane/acryl. (50/50)% |
|---|---|---|
| | Part A | |
| P.1 | Desmodur N3390 | 24.8 |
| P.2 | Butylglycol acetate | 14.2 |
| P.3 | Ethyl-3-ethoxy propionate | 2.0 |
| P.4 | DBTDL (10% in Butyl acetate) | 0.1 |
| P.5 | Hydroxyethyl acrylate | 13.9 |
| | NCO-content: | <0.0% |
| P.6 | Silquest A1170 silane | 20.4 |
| | TOTAL olefin content (%) | 50-60% |
| P.7 | Butylglycol acetate | 5.0 |
| P.8 | Ethyl-3-ethoxy propionate | 5.0 |
| P.9 | CoatOSil 1220 | 0.05 |
| P.10 | CoatOSil 2812 | 0.1 |
| P.11 | Tinuvin 292 | 0.2 |

TABLE 5.1-continued

Composition of olefinized silyl-modified thiol-ene clearcoat - Inventive (in gr.)

|  |  | EX.8 silane/acryl. (50/50)% |
|---|---|---|
| Part B | | |
| P.12 | THIOCURE PETMP | 7.5 |
| P.13 | Xylene | 3.4 |
| P.14 | Butyl acetate | 3.4 |
|  | TOTAL COATING | 100.0 |

The preparation of the Part A of the clearcoat was carried out in three steps: (i) synthesis of olefinized urethane acrylate based on polyisocyanate Desmodur N3390 (Table 5.1, P1-P5); (ii) modification of the olefinized urethane acrylate with the aminosilane Silquest A1170 (Table 5.1, P6); (iii) Letdown of the resulting silane-modified urethane acrylate resin with solvents and additives (Table 5.1, P7-P11).

Capping of the polyisocyanate with the hydroxyethyl acrylate was carried out in a four-neck glass flask equipped with a cooler, mechanical stirrer and a nitrogen counter-flow inlet. At the start of the reaction the glass flask was thoroughly flushed with nitrogen and charged with the polyisocyanate, solvents and catalyst in the nitrogen counterflow. The hydroxyethyl acrylate was then slowly metered into the polyisocyanate solution under vigorous stirring. The reaction was carried out at room temperature using a water bath for cooling down the reaction. Following hydroxyethyl acrylate introduction, the reaction mixture was stirred for additional 30 minutes at room temperature. The reaction flask was then heated up to 60° C. and stirring for additional 6 hours. Finally, the reaction mixture was cooled down to room temperature, collected and analyzed for residual —NCO content.

Capping of the urethane acrylate with the aminosilane was carried out in a four-neck glass flask equipped with a cooler, mechanical stirrer and a nitrogen counter-flow inlet. At the start of the reaction, the glass flask was thoroughly flushed with nitrogen and charged with urethane acrylate. Afterwards, the silane was slowly metered into the reaction solution under vigorous stirring. Following the silane introduction, the reaction mixture was stirred for additional 30 minutes at room temperature. The reaction mixture was then heated up to 80° C. and stirred for additional 6 hours. Afterwards, the reaction mixture was cooled down to room temperature, collected and analyzed for residual olefinic content. Conversion of aza-Michael addition reaction of aminosilane to the urethane acrylate was investigated spectroscopically using IR analysis. For the calculation, a characteristic deformational vibration band of olefinically unsaturated C=C double bond at 810 cm$^{-1}$ wavenumber was utilized. The peak intensity was calibrated by the internal standard—the characteristic stretching C=O band at 1729 cm$^{-1}$ wavenumber. In addition, the conversion of the reaction was investigated with $^1$H-NMR analysis. For this, the ratio of integrals of olefinic double bond proton at the shift 6.2 ppm to aliphatic Si—C proton at the shift δ 0.5 ppm was utilized. The total olefin content (Table 5) was calculated as a wt.-% of unreacted acrylic groups.

The formulation of the Part A clearcoat systems was accomplished by mixing silane modified urethane acrylate with UV-HALS, flow and levelling additives, catalyst (Table 0.1, P7-P11). The resulting mixture was stirred for 30 minutes at 300 rpm, collected and stored in a dry and dark place until further use.

The thiol-based crosslinkers (Table 5.1, Part B) used for curing the coating formulation was prepared separately by diluting SH-containing resins with solvents under nitrogen blanketing (Table 5.1, P12-P14). Resulting crosslinkers were collected and stored in a dry and dark place until further use.

Example 9 (Comparative Example—Urethane Acrylate Thiol-Ene Clearcoat Based on IPDI Polyisocyanate)

The composition of the urethane acrylate coating system used in the study is summarized in Table 6. The clearcoat composition was prepared in accordance with the experimental procedure described in Example 1.

Example 10 (Inventive Example—Silyl-Modified Urethane Acrylate Thiol-Ene Clearcoat Based on IPDI Polyisocyanate)

The composition of the urethane acrylate coating system used in the study is summarized in Table 6. The clearcoat composition was prepared in accordance with the experimental procedure described in Example 2.

TABLE 6

Composition of urethane acrylate thiol-ene clearcoat and silane-modified urethane acrylate thiol-ene clearcoat based on IPDI-based polyisocyanate (in gr.)

|  |  | C. EX.9 acrylate (100)% | EX.10 silane/acryl. (50/50)% |
|---|---|---|---|
| Part A | | | |
| P.1 | Tolonate IDT 70B Tolonate IDT 70 B: aliphatic polyisocyanate (isophorone diisocyanate-trimer) | 31.2 | 29.64 |
| P.2 | Butylglycol acetate | 7.1 | 11.35 |
| P.3 | Ethyl-3-ethoxy propionate | 1 | 1.62 |
| P.4 | Silquest A1170 silane NCO-content: | — — | 14.82 <4% |
| P.4 | DBTDL (10% in Butyl acetate) | 0.1 | 0.08 |
| P.5 | Hydroxyethyl acrylate NCO-content: | 10.9 <0.0% | 5.04 <0.0% |
| P.6 | Butylglycol acetate | 13.9 | 19.5 |
| P.7 | Ethyl-3-ethoxypropoinate | 5.4 | 5.2 |
| P.8 | CoatOSil 1220 | 0.05 | 0.05 |
| P.9 | CoatOSil 2812 | 0.1 | 0.1 |
| P.10 | DBU (1wt.-% in Xylene) | 1.8 | 1.8 |
| P.11 | Tinuvin 292 | 0.2 | 0.2 |
| Part B | | | |
| P12 | THIOCURE PETMP | 12.9 | 5.51 |
| P13 | Butyl acetate | 7.7 | 2.56 |
| P14 | Xylene | 7.7 | 2.56 |
|  | TOTAL COATING | 100 | 100 |

Example 11 (Inventive Example—Silyl-Modified Urethane Acrylate Thiol-Ene Clearcoat)

The composition of the urethane acrylate coating system used in the study is summarized in Table 7 (EX.11). The clearcoat system was prepared in accordance with the experimental procedure described in the Example 2 but using the silane Silquest A-Link600.

Example 12 (Inventive Example—Silyl-Modified Urethane Acrylate Thiol-Ene Clearcoat)

The composition of the urethane acrylate coating system used in the study is summarized in Table 7 (EX.12). The clearcoat system was prepared in accordance with the experimental procedure described in the Example 2 but using the silane Silquest A-189.

Example 13 (Inventive Example—Silyl-Modified Urethane Acrylate Thiol-Ene Clearcoat)

The composition of the urethane acrylate coating system used in the study is summarized in Table 7 (EX.13). The clearcoat system was prepared in accordance with the experimental procedure described in the Example 2 but using the silane Silquest Y-11699.

Example 14 (Inventive Example—Silyl-Modified Urethane Acrylate Thiol-Ene Clearcoat)

The composition of the urethane acrylate coating system used in the study is summarized in Table 7 Clearcoat system was prepared in accordance with the experimental procedure described in the Example 2 but using the silane blend of Silquest A170 and Silquest A-Link 15.

TABLE 7

Composition of urethane acrylate based clearcoat systems modified with various silanes (in gr.)

|  |  | EX.11 Silquest A-Link600 silane/ acryl. (50/50)% | EX. 12 Silquest A189 silane/ acryl. (50/50)% | EX. 13 Silquest Y-11699 Silquest A-Link15 silane/ acryl. (50/50)% | EX. 14 Silquest A1170 silane/ acryl. (50/50)% |
|---|---|---|---|---|---|
| | Part A | | | | |
| P.1 | Desmodur N3390 | 23.69 | 24.4 | 19.58 | 21.98 |
| P.2 | Butylglycol acetate | 16.80 | 17.2 | 17.50 | 17.10 |
| P.3 | Ethyl-3-ethoxy propionate | 2.40 | 3.4 | 2.50 | 2.43 |
| P.4 | Silquest A-Link600 silane | 12.22 | — | — | — |
| P.5 | Silquest A-189 silane | — | 11.2 | — | — |
| P.6 | Silquest Y-11699 silane | — | — | 17.52 | — |
| P.7 | Silquest A1170 silane | — | — | — | 8.76 |
| P.8 | Silquest A-Link 15 silane | — | — | — | 5.69 |
| P.9 | DBU (10 wt.-% in Xylene) | — | 0.5 | — | — |
|  | NCO content | <4.5% | <4.7% | <3.5% | <4.0% |
| P10 | DBTDL (10% in Butyl acetate) | 0.10 | 0.10 | 0.10 | 0.10 |
| P11 | Hydroxyethyl acrylate | 6.42 | 6.6 | 5.31 | 5.95 |
|  | NCO content | <0.0% | <0.0% | <0.0% | <0.0% |
| P12 | Butylglycol acetate | 19.20 | 19.2 | 19.37 | 19.23 |
| P13 | Ethyl-3-ethoxy propoinate | 5.00 | 4.9 | 4.99 | 4.95 |
| P14 | CoatOSil 1220 | 0.05 | 0.05 | 0.05 | 0.05 |
| P15 | CoatOSil 2812 | 0.10 | 0.10 | 0.10 | 0.10 |
| P16 | DBU (1 wt.-% in Xylene) | 1.80 | — | 1.80 | 1.80 |
| P17 | Tinuvin 292 | 0.20 | 0.20 | 0.20 | 0.20 |
| | Part B | | | | |
| P18 | THIOCURE PETMP | 7.03 | 7.2 | 5.88 | 6.54 |
| P19 | Butyl acetate | 2.52 | 2.5 | 2.55 | 2.53 |
| P20 | Xylene | 2.52 | 2.5 | 2.55 | 2.53 |
| | TOTAL COATING | 100.0 | 100.0 | 100.00 | 100.0 |

Example 15 (Inventive Example—Silyl-Modified Urethane Acrylate Thiol-Ene Clearcoat with Reversed Order of Addition of Aminosilane and Hydroxyethyl Acrylate)

A clearcoat composition was prepared in accordance with the experimental procedure described in the Example 2.3, except that hydroxyethyl acrylate (Table 2, P6) was introduced instead of Silquest A1170 (Table 2, P4) and that Silquest A1170 silane (Table 2, P4) was introduced instead of hydroxyethyl acrylate (Table, 2 P6). In addition, DBTDL catalyst solution (Table 2, P5) was introduced prior the introduction of hydroxyethylacrylate. The NCO-content of the reaction mixture after the introduction of hydroxyethyl acrylate was less than 5.5 wt.-%, the NCO-content of the reaction mixture after the introduction of Silquest A1170 silane was less than 0.0%.

Example 16.1-16.6 (Inventive Example—Silyl-Modified Urethane Acrylate Thiol-Ene Clearcoat Containing Alternative Crosslinking Catalysts)

The clearcoat compositions were prepared in accordance with the experimental procedure described in the Example 2.3, except that instead of introducing 1.8 gr of 1 wt.-% of DBU 1.8-Diazabicyclo[5.4.0]undec-7-ene in xylene (Table 2, P11) various alternative catalysts were utilized: (i) EX. 16.1-5 w-% DABCO in xylene; (ii) EX. 16.2-5 wt.-% of triphenylphosphine in xylene; (iii) EX. 16.3-5 wt.-% of sodium methoxide in ethanol; (iv) EX. 14.4-5 wt.-% of trimethylamine in xylene; (v) EX. 16.5-5 wt.-% of hexamethyldisilazane in xylene; (vi) EX. 16.6-5 wt.-% of triethoxyphosphine in xylene;

Example 17 (Test Results from Examples 7-16)

TABLE 8

Mechanical, physical and chemical properties of the
experimental silane modified thiol-ene clearcoat systems
and control coatings from Example 7 and Example 8.
(If not explicitly mentioned test results
are recorded for high bake coating systems).

|  | C. EX. 7.1 acryl. 100% | EX.7.2* silane/ acryl. (50/50)% | EX.7.3* silane/ acryl. (50/50)% | EX.8* silane/ acryl. (50/50)% |
|---|---|---|---|---|
| MECHANICAL PROPERTIES: | | | | |
| Cross-hatch adhesion | Gt1 | Gt0 | Gt0 | Gt0 |
| Mandrel bending test | OK | fail | fail | fail |
| Impact direct (2 KG, 0.5 m) | OK | fail | fail | fail |
| Impact reverse (2 KG, 0.5 m) | OK | fail | fail | fail |
| SCRATCH and MAR RESISTANCE: | | | | |
| Crockmeter start gloss(20')/end gloss/delta | 89.4/ 83.5/ 5.9 | 84.1/ 77.9/ 6.2 | 86.0/ 79.4/ 6.6 | 83.5/ 78.4/ 5.1 |
| HARDNESS: | | | | |
| König pendulum hardness (osc.) HB-cure. after 1 h | 32 | 125 | 129 | 129 |
| König pendulum hardness (osc.) LB-cure, after 14 days | 15 | 37 | 32 | 32 |
| QUV-B: | | | | |
| 500h delta E-color | broke | broke | broke | broke |
| CHEMICAL RESISTANCE: | | | | |
| ΣR | 5 | 15 | 12 | 11 |

*clearcoats EX.7.2, EX.7.3 and EX.8 had pot life less than 3 minutes after mixing The test results summarized in the table 8 demonstrate that unlike silane modified clearcoat system from EX. 2.3, the incorporation of aminosilanes into the commercial urethane acrylates (or olefinized polyisocyanate from EX.1) via aza-Michael addition or in-situ aza-Michael addition (by adding aminosilane into the thiol crosslinker) yields clearcoat systems with high hardness but comparatively low impact resistance, low bending elasticity (failed bending test), low resistance to cracking after QUV-B (broke during testing) and low chemical resistance. Thus, it is preferable in accordance with the invention to introduce the silane directly into the polyisocyanate resin backbone via reaction of silyl functional compounds (C) having at least one isocyanate-reactive functional group with an isocyanate rather than reacting the aminosilane with acrylic function of urethane acrylate (aza-Michael addition), which is less preferred.

TABLE 9

Mechanical, physical and chemical properties of
the experimental silane modified thiol-ene clearcoat
systems and control coatings from Example 9 and
10. (If not explicitly mentioned test results are
recorded for high bake coating systems).

|  | C. EX.9 acryl. 100% | X.10 silane/acryl. (50/50)% |
|---|---|---|
| MECHANICAL PROPERTIES: | | |
| Cross-hatch adhesion | Gt0 | Gt0 |
| Mandrel bending test | OK | fail |
| Impact direct (2 KG, 0.5 m) | OK | fail |
| Impact reverse (2 KG, 0.5 m) | OK | fail |
| SCRATCH and MAR RESISTANCE: | | |
| Crockmeter start gloss(20')/end gloss/delta | 89.2/ 85.5/3.7 | 85.5/ 76.6/8.9 |
| HARDNESS: | | |
| König pendulum hardness (osc.) HB-cure, after 1 h | 122 | 135 |
| König pendulum hardness (osc.) LB-cure, after 14 days | 110 | 115 |
| QUV-B: | | |
| 500h delta E-color | broke | broke |
| CHEMICAL RESISTANCE: | | |
| ΣR | 15 | 27 |

(HB: High bake; LB: Low Bake)

The test results summarized in the table 9 demonstrate that the type of polyisocyanate resin used for the formulation of the thiol-ene clearcoat system can have an influence on its properties. Here the substitution of the polyisocyanate resin based on hexamethylene diisocyanate (HDI) with a polyisocyanate based on isophorone diisocyanate (IPDI) allows coating systems with higher chemical resistance and hardness at low bake cure conditions. This example shows that the use of IPDI-based polyisocyanate resin optionally in combination with other polyisocyanates can be preferred if low bake cure conditions are applied.

TABLE 10

Mechanical, physical and chemical properties of
the experimental silane modified thiol-ene clearcoat
systems from Example 11-14.
(If not explicitly mentioned test results are
recorded for high bake coating systems).

|  | EX.11 silane/ acryl. (50/50)% | EX.12 silane/ acryl. (50/50)% | EX.13 silane/ acryl. (50/50)% | EX.14 silane/ acryl. (50/50)% |
|---|---|---|---|---|
| MECHANICAL PROPERTIES: | | | | |
| Cross-hatch adhesion | Gt0 | Gt0 | Gt0 | Gt0 |
| Mandrel bending test | OK | OK | OK | OK |
| Impact direct (2 KG, 0.5 m) | OK | OK | OK | OK |
| Impact reverse (2 KG, 0.5 m) | OK | OK | OK | OK |
| SCRATCH and MAR RESISTANCE: | | | | |
| Crockmeter start gloss(20')/end gloss/delta | 84.5/ 77.5/ 7.0 | 83.3/ 79.2/ 4.1 | 84.4/ 79.3/ 5.1 | 82.9/ 75.8/ 7.1 |
| HARDNESS: | | | | |
| König pendulum hardness (osc.) HB-cure, after 1 h | 119 | 82 | 109 | 121 |

TABLE 10-continued

Mechanical, physical and chemical properties of
the experimental silane modified thiol-ene clearcoat
systems from Example 11-14.
(If not explicitly mentioned test results are
recorded for high bake coating systems).

| | EX.11 silane/ acryl. (50/50)% | EX.12 silane/ acryl. (50/50)% | EX.13 silane/ acryl. (50/50)% | EX.14 silane/ acryl. (50/50)% |
|---|---|---|---|---|
| König pendulum hardness(osc.) LB-cure, after 14 days | 32 | 21 | 15 | 39 |
| QUV-B: | | | | |
| 500h delta E-color | 7.2 | 6.5 | 7.8 | 8 |
| CHEMICAL RESISTANCE: | | | | |
| ΣR | 20 | 21 | 19 | 20 |

Test results summarized in the table 10 demonstrate the utility of various organofunctional silanes (e.g. primary methoxy-functional aminosilane, thiosilane, secondary ethoxy-functional aminosilane and combinations of various aminosilanes) for the formulation of mechanically durable, chemically resistant and scratch resistant clearcoat finish of the current invention.

Table 11. Mechanical, Physical and Chemical Properties of the Experimental Silane Modified has no sufficient impact on the mechanical, physical and chemical properties of the resulting silane-modified thiol-ene clearcoat systems; (ii) various base-type catalytic systems can be successfully utilized to catalyze thiol-ene addition and siloxane condensation curing reactions.

Example 18 (Silane Modified Urethane Acrylate Thiol-Ene Topcoat System and Urethane Acrylate Control Topcoat System)

The formulations of the urethane acrylate coating systems with or without silane modification used in the study are summarized in Table 12.

The preparation of the Part A topcoat was carried out in two steps: (i) synthesis of the silane modified urethane acrylate resin (Table 12, P1-P6); (ii) dispersing of pigments and fillers in the modified urethane acrylate resin Table 12, P7-P10); (iii) letdown of the resin with solvents and additives (Table 12, P11-P16).

Stage 1 of the topcoat preparation (urethane acrylate synthesis) was carried out in accordance with the general experimental procedure described in the Example 1 and Example 2 (Table 1, P1-P and Table 2, P1-P6). The dispersion of pigments and fillers in the urethane acrylate resin was carried out in several steps. Firstly, the liquid urethane acrylate resin (Table 12, P1-P6) was mixed with solid ingredients (Table 13, P7-P10) under mild agitation and nitrogen blanketing. The resulting pre-mixed slurry was stirred with cowles blade laboratory mixer for additional 30 minutes at 500 rpm. Afterwards, the resulting pre-dispersed

TABLE 11

Mechanical, physical and chemical properties of the experimental silane modified thiol-ene clearcoat systems from Example 15 and 16.

| | EX. 15 acryl./silane 50/50% | EX. 16.1 silane/acryl. (50/50)% | EX. 16.2 silane/acryl. (50/50)% | EX. 16.3 silane/acryl. (50/50)% | EX. 16.4 silane/acryl. (50/50)% | EX. 16.5 silane/acryl. (50/50)% | EX. 16.6 silane/acryl. (50/50)% |
|---|---|---|---|---|---|---|---|
| MECHANICAL PROPERTIES: | | | | | | | |
| Cross-hatch adhesion | Gt0 | Gt0 | Gt0 | Gt0 | Gt0 | Gt0 | Gt0 |
| Mandrel bending test | OK | OK | OK | OK | OK | OK | OK |
| Impact direct (2 KG, 0.5 m) | OK | OK | OK | OK | OK | OK | OK |
| Impact reverse (2 KG, 0.5 m) | OK | OK | OK | OK | OK | OK | OK |
| SCRATCH and MAR RESISTANCE: | | | | | | | |
| Crockmeter start gloss(20')/end gloss/delta | 83.5/78.4/5.1 | 84.1/77.9/6.2 | 81.0/75.5/5.5 | 82.4/75.2/7.2 | 81.9/76.6/5.3 | 85.4/79.2/6.2 | 79.8/72.1/7.7 |
| HARDNESS: | | | | | | | |
| König pendulum hardness (osc.) HB-cure, after 1 h | 125 | 120 | 115 | 118 | 121 | 110 | 114 |
| König pendulum hardness (osc.) LB-cure, after 14 days | 40 | 36 | 32 | 37 | 42 | 31 | 29 |
| CHEMICAL RESISTANCE: | | | | | | | |
| ΣR | 23 | 22 | 23 | 25 | 20 | 21 | 20 |

(If not explicitly mentioned test results are recorded for high bake coating systems).

The test results summarized in table 11 demonstrate that: (i) changing the order of introduction of aminosilane and hydroxyethyl acrylate into the polyisocyanate prepolymer mixture was grinded with laboratory bead mill for 45 minutes at room temperature using Zr-beads (Ø1.2-1.8 mm). In the stage 2, the mill grind was collected, filtered through 20 micron laboratory sieve filter and diluted with solvents additives and catalyst (Table 12, P11-P16). Finally, the resulting white topcoat was collected and stored in the dark and dry place until further use.

The thiol-based crosslinkers (Table 12, Part B) used for curing the coating formulation were prepared separately by diluting SH-containing resins with solvents under nitrogen blanketing (Table 12, P17-P19). The resulting crosslinkers were collected and stored in a dry and dark place until further use.

TABLE 12

Composition of urethane acrylate based topcoat systems formulated with (EX. 18.2) or without (EX .18.1) Silquest A1170 silane (in qr.)

|  |  | C.EX.18.1 acrylate (100)% | EX.18.2 silane/ acryl. (50/50)% |
|---|---|---|---|
| Part A |  |  |  |
| P.1 | Desmodur N3390 | 16.1 | 11.8 |
| P.2 | Butylglycol acetate | 9.2 | 9.9 |
| P.3 | Ethyl-3-ethoxy propionate | 1.3 | 1.4 |
| P.4 | Silquest* A1170 silane | — | 9.4 |
| P.5 | DBTDL (10% in Butyl acetate) | 0.05 | 0.05 |
| P.6 | Hydroxyethyl acrylate | 9.0 | 3.2 |
| P.7 | Ti-Pure R960 | 8.2 | 8.2 |
| P.8 | Blanc Fixe | 13.6 | 13.6 |
| P.9 | Microtalc AT | 6.8 | 6.8 |
| P.10 | Heucophos ZPA | 3.4 | 3.4 |
| P.11 | Butylglycol acetate | 9.7 | 14.7 |
| P.12 | Ethyl-3-ethoxy propionate | 4.0 | 3.9 |
| P.13 | CoatOSil 1220 | 0.04 | 0.04 |
| P.14 | CoatOSil 2812 | 0.1 | 0.1 |
| P.15 | DBU (1 wt.-% in Xylene) | 1.2 | 1.2 |
| P.16 | Tinuvin 292 | 0.1 | 0.2 |
| Part B |  |  |  |
| P.17 | THIOCURE PETMP | 11.2 | 3.6 |
| P.18 | Butyl acetate | 2.9 | 4.3 |
| P.19 | Xylene | 2.9 | 4.3 |
|  | TOTAL COATING | 100.0 | 100.0 |

Example 19 (Comparative Example—Urethane Acrylate Thiol-Ene Clearcoat Based on Desmodur N3900 and Pentaerythritol Triacrylate (PETA))

A clearcoat composition was prepared in accordance with the experimental procedure described in the Example 1, except that Desmodur N3900 was introduced instead of Desmodur N3390 (Table 1, P1) and 40.8 gr of PETA (Pentaerythritol triacrylate) was introduced instead of hydroxyethyl acrylate (Table 1, P5). NCO-content of the reaction mixture after the introduction of PETA was less than 0.0%. For the formulation of the clearcoat system 52.1 gr of THIOCURE PETMP was used in the Part B of the thiol crosslinker (Table 1, Part B)

Example 20 (Inventive Example—Silane-Modified Urethane Acrylate Thiol-Ene Clearcoat Based on Desmodur N300 and PTA)

A clearcoat composition was prepared in accordance with the experimental procedure described in the Example 2 (EX.2.3), except that Desmodur N3900 was introduced instead of Desmodur N3390 (Table 2, EX.2.3, P1), 19.6 gr of the silane Silquest A1170 were added (Table 2, EX.2.3, P4), 17.1 gr of PETA was used instead of hydroxyethyl acrylate (Table 2, EX.2.3, P6). The NCO-content of the reaction mixture after the introduction of the Silquest A1170 silane and PETA was less than 0.0%. For the formulation of the clearcoat system, 21.8 gr of THIOCURE PETMP were added to the Part B of the thiol crosslinker (Table 2, Part B).

Example 21 (Inventive Example—Silyl-Modified Urethane Acrylate Thiol-Ene Clearcoat Based on Desmodur VL and HEA (Hydroxyethyl Acrylate)

A clearcoat composition was prepared in accordance with the experimental procedure described in the Example 2 (EX.2.3), except that the aromatic polyisocyanate Desmodur VL was introduced instead of Desmodur N3390 (Table 2, EX.2.3, P1), 19.6 gr of the aromatic silane Silquest Y-9669 were added instead of Silquest A1170 silane (Table 2, EX.2.3, P4) and 9.2 gr of HEA were used (Table 2, EX.2.3, P6). The NCO-content of the reaction mixture after the introduction of the silane Silquest Y-9669 and HEA was less than 0.0%. For the formulation of the clearcoat system, 5.8 gr of THIOCURE PETMP were added to the Part B of the thiol crosslinker (Table 2, Part B).

Example 22 (Test Results from Example 18-21)

TABLE 13

Mechanical, physical and chemical properties of the experimental silane modified thiol-ene clearcoat systems and control coatings from Example 18, Example 19, Example 20 and Example 21. (If not explicitly mentioned test results are recorded for high bake coating systems).

|  | C.EX.18.1 acryl. 100% | EX.18.2 silane/ acryl. (50/50)% | C.EX.19 acryl. 100% | EX.20 silane/ acryl. (50/50)% | EX.21 silane/ acryl. (50/50)% |
|---|---|---|---|---|---|
| MECHANICAL PROPERTIES: |  |  |  |  |  |
| Cross-hatch adhesion | Gt3 | Gt0 | Gt3 | Gt0 | Gt0 |
| Mandrel bending test | OK | OK | OK | OK | OK |
| Impact direct (2 KG, 0.5 m) | OK | OK | OK | OK | OK |
| Impact reverse (2 KG, 0.5 OK m) | OK | OK | OK | OK |  |
| HARDNESS: |  |  |  |  |  |
| König pendulum hardness (osc.) HB-cure, after 1 h | 18 | 66 | 12 | 56 | 85 |
| CHEMICAL RESISTANCE: |  |  |  |  |  |
| ΣR | 8 | 19 | 7 | 19 | 14 |

The test results summarized in the table 13 demonstrate that: (i) modification of pigmented thiol-ene based topcoat system with silane allows coating finishes with improved cross-hatch adhesion, film hardness and chemical resistance (high ΣR values for the inventive examples); (ii) pentaerythritol triacrylate can be used to substitute hydroxyethyl acrylate asa source of olefinic groups in the silane-modified thiol-ene clearcoat; (iii) aromatic polyisocyanates (Desmodur VL?) and aromatic aminosilanes can be used to formulate silane-modified thiol-ene cleracoat systems with improved properties.

Example 23 (Silyl-Modified, Solvent-Free Urethane Acrylate Thiol-Ene Clearcoat and Solvent-Free Control Thiol-Ene Clearcoat, Cured with UV Irradiation)

The formulations of the control solvent-free clearcoat and silane modified, solvent-free urethane acrylate clearcoat systems used in the study are summarized in Table 14.

TABLE 14

Composition of control clearcoat and Silquest A1170 silane modified urethane acrylate based clearcoat (in gr.)

|      |                           | C. EX.23.1 control coating | EX. 23.2 silane/ acryl. (50/50)% |
|------|---------------------------|---------------------------|----------------------------------|
|      | Part A (coating)          |                           |                                  |
| P.1  | Desmodur N3900            | 18.6                      | 14.5                             |
| P.2  | Silquest A1170 silane     | —                         | 13.9                             |
| P.3  | 1,6-Hexanediol diacrylate | 15.9                      | 17.8                             |
|      | NCO-content:              |                           | <4.0%                            |
| P.4  | DBTDL (10% in Butyl acetate) | 0.1                    | 0.1                              |
| P.5  | Hydroxyethyl acrylate     | 12.4                      | 4.9                              |
|      | NCO-content:              | <0.0%                     | <0.0%                            |
| P.6  | 1,6-Hexanediol diacrylate | 18.2                      | 20.0                             |
| P.7  | Nacure 4054               | —                         | 0.5                              |
| P.8  | CoatOSil 1220             | 0.1                       | 0.1                              |
| P.9  | CoatOSil 2812             | 0.03                      | 0.03                             |
| P.10 | Lucirin TPO-L             | 1.5                       | 1.5                              |
| P.11 | Tinuvin 292               | 0.3                       | 0.3                              |
|      | Part (B)                  |                           |                                  |
| P.12 | THIOCURE PETMP            | 32.8                      | 26.5                             |
|      | TOTAL COATING             | 100.0                     | 100.0                            |

The preparation of the Part A of the control clearcoat EX.23.1 was carried out in two steps: (i) synthesis of the polyisocyanate modified urethane acrylate resin (Table 14, P1-P5); (ii) letdown of the resin with solvents and additives (Table 14, P6-P11).

Capping of the polyisocyanate with the hydroxyethyl acrylate was carried out in a four-neck glass flask equipped with a cooler, mechanical stirrer and a nitrogen counter-flow inlet. At the start of the reaction, the glass flask was thoroughly flushed with nitrogen and charged with the polyisocyanate, reactive diluent and catalyst in the nitrogen counterflow. The hydroxyethyl acrylate was then slowly metered into the polyisocyanate solution under vigorous stirring. The reaction was carried out at room temperature using a water bath for cooling down the reaction. Following the hydroxyethyl acrylate introduction, the reaction mixture was stirred for additional 30 minutes at room temperature. The reaction flask was then heated up to 60° C. and stirring for additional 6 hours. Finally, the reaction mixture was cooled down to room temperature, collected and analyzed for residual —NCO content. The formulation of the Part A clearcoat system was accomplished by mixing the resulting urethane acrylate resin solution with UV-photoinitiator Nacure 4054, UV-HALS, flow and levelling additives and the reactive diluent 1,6-Hexanediol diacrylate (Table 14, P.6-P.11). The mixture was stirred for 30 minutes at 300 rpm, collected and stored in a dry and dark place until further use. This corresponds to the pre-polymer with additives quoted below. The thiol-based crosslinker (Table 14, Part B) was used as supplied.

The preparation of the Part A of the silane modified clearcoat EX.23.2 was carried out in two steps: (i) synthesis of the silane modified urethane acrylate resin (Table 14, P1-P5); (ii) letdown of the resin with solvents and additives (Table 14, P6-P11).

Preparation of silane-modified urethane acrylate resin was carried out by reacting polyisocyanate pre-polymer with aminosilane (Table 14, P1-P3) followed by capping the remaining —NCO groups with the hydroxyl-functional alkyl acrylate (Table 14, P4, P6).

The modification of the polyisocyanate with the aminosilane was carried out in a four-neck glass flask equipped with a cooler, mechanical stirrer and a nitrogen counter-flow inlet. At the start of the reaction, the glass flask was thoroughly flushed with nitrogen and charged with polyisocyanate in the nitrogen counterflow. The silane was then slowly metered into the pre-diluted polyisocyanate solution under vigorous stirring. The reaction was carried out at room temperature using a water bath for cooling down the reaction. Following the silane introduction, the reaction mixture was stirred for additional 30 minutes at room temperature. The reaction flask was then heated up to 60° and stirring for additional 2 hours. Afterwards, the reaction mixture was cooled down to room temperature mixed with reactive diluent, collected and analyzed for residual —NCO content. The capping of the silane-modified polyisocyanate with the hydroxyethyl acrylate was carried out in a four-neck glass flask equipped with a cooler, mechanical stirrer and a nitrogen counter-flow inlet. At the start of the reaction, the glass flask was thoroughly flushed with nitrogen and charged with the solution of silane-modified polyisocyanate and catalyst in the nitrogen counterflow. The hydroxyethyl acrylate was then slowly metered into the polyisocyanate solution under vigorous stirring. The reaction was carried out at room temperature using a water bath for cooling down the reaction. Following the hydroxyethyl acrylate introduction, the reaction mixture was stirred for additional 30 minutes at room temperature. The reaction flask was then heated up to 60° C. and stirring for additional 6 hours. Finally, the reaction mixture was cooled down to room temperature, collected and analyzed for residual —NCO content.

The formulation of the Part A clearcoat systems was accomplished by mixing silane modified urethane acrylate with UV-photoinitiator, UV-HALS Tinuvin 292, flow and levelling additives, catalyst and the reactive diluent (Table 14, P.6-P.11). The resulting mixture was stirred for 30 minutes at 300 rpm, collected and stored in a dry and dark place until further use. The thiol-based crosslinker (Table 14, Part B) was used as supplied.

Example 24. Test Results from Example 23

The clearcoat compositions of example 23 were cured using a combination of UV-light irradiation and temperature cure. For this, test panels with freshly sprayed clearcoats from EX.23.1 and EX.23.2 were irradiated for 3 minutes, from the distance of 10 cm. with the portable laboratory UV-lamp equipped with a UV-A black light filter. Afterwards the test panels were baked in the laboratory oven in accordance with the general procedure described in the Example 4.

TABLE 15

Mechanical, physical and chemical properties
of the experimental silane modified thiol-ene clearcoat
systems and control atinos from example 23

|  | C.EX.23.1 acryl. 100% | EX.23.2 silane/acryl. (50/50)% |
|---|---|---|
| MECHANICAL PROPERTIES: | | |
| Cross-hatch adhesion | Gt3 | Gt0 |
| Mandrel bending test | OK | OK |
| Impact direct (2 KG, 0.5 m) | OK | OK |
| Impact reverse (2 KG, 0.5 m) | OK | OK |
| HARDNESS: | | |
| König pendulum hardness (osc.) after UV-cure | 18 | 15 |
| König pendulum hardness (osc.) after HB-cure | 19 | 68 |
| CHEMICAL RESISTANCE: | | |
| ΣR | 6 | 18 |

Test results summarized in the table 15 demonstrate that: (i) alternative to base catalyzed thiol-ene Michael addition the reaction between the thiol groups from the thiol cross-linker of part B and the olefin from the hydroxyethylacrylate can be catalyzed in the presence of a photoinitiator and UV-light. The resulting coating systems are elastic and soft; (ii) incorporation of silane cure into the clearcoat allows improved coating hardness, chemical resistance and substrate adhesion after baking the coating film.

Example 25 (Urethane Acrylate Thiol-Ene Clearcoat Based on Silquest A-Link 35 (an Isocyanate Silane), Silquest A174 (a (Meth)Acrylate Silane), Silquest A187 (an Epoxy Silane) an Silquest A14 (a Halogenalkyl Silane) Modified Polythiol Crosslinker and a Urethane Acrylate A") which does not have Silyl Groups)

The composition of the urethane acrylate coating system used in the study is summarized in Table 16. The clearcoat system was prepared in accordance with the experimental procedure described in the Example 1, except that the thiol crosslinker was modified by incorporating a silyl group.

In case of Silquest A-Link35 silane (an isocyanate silane—Table 16, EX. 25.1) chemical modification was carried out in a four-neck glass flask equipped with a cooler, mechanical stirrer and a nitrogen counter-flow inlet. At the start of the reaction the glass flask was thoroughly flushed w ii re ad charged with THIOCURE®PETMP thiol resin. Afterwards the resin was mixed with catalyst, and solvents (Table 16, P11-13) was stirred at room temperature for 15 minutes. The silane Silquest A-Link35 was then slowly metered into the pre-diluted polythiol solution under vigorous stirring. The reaction was carried out at room temperature using a water bath for cooling down the reaction. Following the silane introduction, the reaction mixture was stirred for additional 30 minutes at room temperature. The reaction flask was then heated up to 60° C. and stirred for additional 2 hours. Afterwards, the reaction mixture was cooled down to room temperature, collected and analyzed for residual —NCO content. Residual —NCO content of the reaction mixture was less than 0.2%

In case of Silquest A187 silane (an epoxy silane—Table 16, EX.25.2) chemical modification was carried out in a four-neck glass flask equipped with a cooler, mechanical stirrer and a nitrogen counter-flow inlet. At the start of the reaction the glass flask was thoroughly flushed with nitrogen and charged with THIOCURE®PETMP thiol resin. Afterwards the resin was mixed with catalyst, silane and solvents (Table 9, P11-16) and stirred for additional 30 minutes at room temperature. The reaction mixture was then heated up to 80° C. and stirred for additional 6 hours. Afterwards, the reaction mixture was cooled down to room temperature, collected and analyzed with $^1$H-NMR for residual epoxide content. For this ratio of integrals of epoxy proton at δ 3.2 ppm to aliphatic Si—C proton at δ 0.8 ppm were utilized. Conversion of epoxy groups was more than 90%.

In case of Silquest A174 silane (a (meth)acrylate silane—Table 16, EX.25.3) chemical modification was carried out in a four-neck glass flask equipped with a cooler, mechanical stirrer and a nitrogen counter-flow inlet. At the start of the reaction the glass flask was thoroughly flushed with nitrogen and charged with THIOCURE®PETMP thiol resin. Afterwards the resin was mixed with catalyst, silane and solvents (Table 16, P11-17) and stirred for additional 30 minutes at room temperature. The reaction mixture was then heated up to 80° and stirred for additional 240 hours. Afterwards, the reaction mixture was cooled down to room temperature, collected and analyzed with $^1$H-NMR for residual methacrylic. For this ratio of integrals of methacrylic proton at δ 5.5 ppm to aliphatic Si—C proton at δ 0.8 ppm were utilized. Conversion of methacrylic groups was more than 10%.

In case of Silquest A143 silane (a halogenalkyl silane—Table 16, EX.25.4) chemical modification was carried out in a four-neck glass flask equipped with a cooler, mechanical stirrer and a nitrogen counter-flow inlet. At the start of the reaction the glass flask was thoroughly flushed with nitrogen and charged with THIOCURE®PETMP thiol resin. Afterwards the resin was mixed with catalyst, silane and solvents (Table 16, P11-18) and stirred for additional 30 minutes at room temperature. The reaction mixture was then heated up to 140° C. and stirred for additional 4 hours. Afterwards, the reaction mixture was cooled down to room temperature, collected, filtered and analyzed for residual —SH content. Conversion of thiol groups was more than 10%.

Resulting crosslinkers from EX.25.1-25.4 were collected and stored in a dry and dark place until further use.

TABLE 16

Composition of urethane acrylate based clearcoat
systems formulated with Silquest A-Link35 Silquest A187,
Silquest A174 and Silquest A143 silane modified thiol-
crosslinker (in gr.)

|  |  | EX.25.1 PETMP 50% mod. with Silquest A-Link 35 | EX.25.2 PETMP 50% mod. with Silquest A187 | EX.25.3 PETMP 50% mod. with Silquest A174 | EX.25.4 PETMP 50% mod. with Silquest A143 |
|---|---|---|---|---|---|
| Part A | | | | | |
| P.1 | Ethercure ® 6150 urethane acrylate commercial | 17.33 | 16.55 | 15.94 | 13.82 |
| P.2 | Butylglycol acetate | 1.31 | 1.25 | 1.21 | 1.05 |
| P.3 | Ethyl-3-ethoxy propionate | 1.31 | 1.25 | 1.21 | 1.05 |
| P.4 | Butyl acetate | 1.31 | 1.25 | 1.21 | 1.05 |
| P.5 | Xylene | 1.53 | 1.46 | 1.41 | 1.22 |
| P.7 | CoatOSil*7001E | 0.07 | 0.06 | 0.07 | 0.06 |

TABLE 16-continued

Composition of urethane acrylate based clearcoat systems formulated with Silquest A-Link35 Silquest A187, Silquest A174 and Silquest A143 silane modified thiol-crosslinker (in gr.)

|  |  | EX.25.1 PETMP 50% mod. with Silquest A-Link 35 | EX.25.2 PETMP 50% mod. with Silquest A187 | EX.25.3 PETMP 50% mod. with Silquest A174 | EX.25.4 PETMP 50% mod. with Silquest A143 |
|---|---|---|---|---|---|
| P.8 | Tinuvin ® 292 | 0.10 | 0.09 | 0.09 | 0.08 |
| P.9 | DBU (1% in Xylene) | 1.78 |  |  |  |
|  | Part B (crosslinker) |  |  |  |  |
| P.10 | THIOCUREO ® PETMP | 35.89 | 34.60 | 33.95 | 29.45 |
| P.11 | Xylene | 5.15 | 4.97 | 4.87 | 4.23 |
| P.12 | Butyl acetate | 5.15 | 4.97 | 4.87 | 4.23 |
| P.13 | DBU cat (1% in xylene) | 0.06 | 1.80 | 1.73 |  |
| P.15 | Silquest A-Link 35 | 29.00 |  |  |  |
| P.16 | Silquest A-187 |  | 31.77 |  |  |
| P.17 | Silquest A-174 |  |  | 33.44 |  |
| P.18 | Silquest A-143 |  |  |  | 29.00 |
| P.19 | inethylamine |  |  |  | 14.30 |
| TOTAL COATING |  | 100.0 | 100.0 | 100.0 | 100.0 |

The incorporation of alkoxysilyl functionality to the polythiol crosslinker allows the formulation of clearcoat systems with improved scratch and mar resistance, chemical resistance and outdoor durability due to the nature of siloxane bonds combined with good mechanical flexibility and bending elasticity due to the nature of thioether bonds. In addition, the incorporation of silyl function into the polythiol crosslinker opens up a possibility of formulating coating systems based not only on urethane acrylates but also on polyester acrylates, polyether acrylates and epoxy acrylates.

Example 27 (Comparative Example: Silyl Modified Urethane Acrylate without Polythiol Crosslinker Prepared Via Photopolymerization and Temperature Cure)

A clearcoat composition was prepared in accordance with the experimental procedure described in the Example 2.3, except the formulation of Part A (Table 2) was additionally charged with 1.22 gr of Lucirin TPO-L photoinitiator.

Example 28 (Comparative Example: Silyl Modified Urethane Acrylate without Polythiol Crosslinker Prepared Via Temperature Cure)

A clearcoat composition was prepared in accordance with the experimental procedure described in the Example 2.3, except the formulation of Part A (Table 2) was additionally charged with 1.22 gr of Initiator BK radical initiator.

Example 29. Test Results from Example 27 and 28

The clearcoat composition of example 27 was cured using a combination of UV-light irradiation and temperature cure. For this, test panels with freshly sprayed clearcoats from EX.26 were flashed off for 15 minutes at room temperature and irradiated for 3 minutes, from the distance of 10 cm. with the portable laboratory UV-lamp. Afterwards test panels were baked in the laboratory oven in accordance with the general procedure described in the Example 4. The clearcoat composition of example 28 was cured using a temperature cure. For this, test panels with freshly sprayed clearcoats from EX.27 were baked in the laboratory oven in accordance with the general procedure described in the Example 4.

TABLE 17

Test results from examples 27 and 28

|  | EX.27 silane/acryl. (50/50)% | EX.28 silane/acryl. (50/50)% |
|---|---|---|
| MECHANICAL PROPERTIES: |  |  |
| Cross-hatch adhesion | Gt1 | Gt2 |
| Mandrel bending test | NOK* | NOK |
| Impact direct (2 KG, 0.5 m) | NOK | NOK |
| Impact reverse (2 KG, 0.5 m) | NOK | NOK |
| SCRATCH and MAR RESISTANCE: |  |  |
| Crockmeter start gloss(20')/ end gloss/delta | 83.2/79.7/ 3.5 | 85.4/82.5/ 2.9 |
| HARDNESS: |  |  |
| König pendulum hardness (osc.) HB-cure, after 1 h | 142 | 139 |
| QUV-B: |  |  |
| 500 h delta E-color | tbd |  |
| 500 h start gloss(20')/ end gloss/ delta | tbd |  |
| CHEMICAL RESISTANCE: |  |  |
| ΣR | 24 | 23 |

(NOK: Failed)

Results from example 27 and 28 teach that silane modified urethane acrylate coating systems of example 2.3 formulated without polythiol crosslinker and cured either by photopolymerization and temperature cure or radically initiated temperature cure demonstrate good scratch resistance, good hardness and good chemical resistance, however lack impact resistance and bending elasticity.

The invention claimed is:

1. A curable composition, comprising:
   (A) one or more compounds having two or more olefinically unsaturated functional groups and at least one silyl group which is prepared by
   (i) reacting a polyisocyanate (D) having three or more isocyanate groups, with one or more silyl functional compounds (C) having at least one isocyanate-reactive functional group, in a molar ratio that provides for remaining isocyanate groups, and subsequently reacting the reaction product of the polyisocyanate (D) and the silyl functional compound(s) (C) having at least one isocyanate-reactive functional group with one or more compounds (E) having at least one olefinically unsaturated functional group and at least one isocyanate-reactive functional group, or
   (ii) reacting first the polyisocyanates (D) with one or more compounds (E) having at least one olefinically unsaturated functional group and at least one isocyanate-reactive functional group, and then reacting the reaction product of compound (D) and (E) with the silyl functional compound(s) (C), and
   (B) at least one polythiol.

2. The curable composition according to claim 1, comprising one or more curing catalysts.

3. The curable composition according to claim 1, wherein the polythiol (B) is selected from compounds of the formula (I):

$$R^1-(SH)_n \quad (I)$$

wherein $R^1$ is an organic residue and n is an integer of at least 2.

4. The curable composition of claim 3, wherein the polythiol (B) is selected from the group consisting of pentaerythritol tetrakis(3-mercaptopropionate), trimethylolpropane tris(3-mercaptopropionate), and tris[2-(3-mercaptopropionyloxy)ethyl] isocyanurate.

5. The curable composition according to claim 1, wherein the compounds having two or more olefinically unsaturated functional groups and at least one silyl group (A) are of the formula (III):

$$(R^4)_x-R^5-(R^6)_y \quad (III)$$

wherein
$R^4$ is an olefinically unsaturated functional group,
$R^5$ is an (x+y)-valent organic residue,
$R^6$ is a silyl group,
x is an integer of at least 2, and
y is an integer of at least 1.

6. The curable composition according to, claim 1, wherein the polyisocyanates (D) are of the formula (IV):

$$R^7-(NCO)_z \quad (IV)$$

wherein $R^7$ is a z-valent organic residue and z is at least 3.

7. The curable composition according to claim 1, wherein the one or more silyl functional compounds (C) having at least one isocyanate-reactive functional group are of the formula (V):

$$(R^8)_v-R^9-(R^6)_w \quad (V)$$

wherein
$R^8$ is an isocyanate-reactive functional group,
$R^9$ is a (v+w)-valent organic residue,
$R^6$ is a silyl group which is capable of forming Si—O—Si crosslinks upon exposure to moisture,
v is an integer of 1 or 2, and
w is an integer of 1 or 2.

8. The curable composition of claim 7, wherein $R^8$ is an amino group.

9. The curable composition according to claim 1, wherein the one or more compounds (E) having at least one olefinically unsaturated functional group and at least one isocyanate-reactive functional group are of the formula (VI):

$$(R_{10})_c-R^{11}-(R^4)_d \quad (V)$$

wherein
$R^{10}$ is an isocyanate-reactive functional group,
$R^{11}$ is an aliphatic (c+d)-valent residue,
$R^4$ is an olefinically unsaturated functional group,
c is an integer of 1 or 2, and
d is an integer of 1 or 2.

10. The curable composition of claim 9, wherein $R^{10}$ is a hydroxy group.

11. The curable composition according to claim 1, wherein the one or more compounds (E) having at least one olefinically unsaturated functional group and at least one isocyanate-reactive functional group are selected from hydroxyl-functional (meth)acrylic monomers.

12. The curable composition of claim 11, wherein the one or more compounds (E) having at least one olefinically unsaturated group and at least one isocyanate-reactive functional group are selected from hydroxyalkyl(meth)acrylic monomers.

13. The composition of claim 1, wherein the polythiol (B), comprises at least one silyl group.

14. A method of coating a substrate comprising applying the curable composition according to claim 1 to said substrate and curing the curable composition.

15. A cured composition obtained by curing the curable composition according to claim 1.

16. A cured article, comprising the cured composition according claim 15.

17. A curable composition, comprising:
(A') one or more compounds (A-1) having two or more olefinically unsaturated functional groups and at least one silyl functional group, which compound (A-1) is formed by (1) the reaction of a silyl functional compound (C) having at least one isocyanate-reactive functional group, with a polyisocyanate (D) having three or more isocyanate groups, in a molar ratio that provides for remaining isocyanate groups, followed by the reaction of the reaction product of (C) and (D) with a compound (E) having at least one olefinically unsaturated functional group and at least one isocyanate-reactive functional group or (2) reacting the polyisocyanate (D) with the compound (E) followed by the reaction of the reaction product of (D) and (E) with the silyl functional compound (C), and
(B) at least one polythiol comprising at least one silyl group.

* * * * *